United States Patent
Saito

(10) Patent No.: US 10,273,410 B2
(45) Date of Patent: Apr. 30, 2019

(54) LIQUID CRYSTAL COMPOSITION AND LIQUID CRYSTAL DISPLAY DEVICE

(71) Applicants: JNC Corporation, Tokyo (JP); JNC PETROCHEMICAL CORPORATION, Tokyo (JP)

(72) Inventor: Masayuki Saito, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 3 days.

(21) Appl. No.: 15/479,286

(22) Filed: Apr. 5, 2017

(65) Prior Publication Data
US 2017/0298276 A1  Oct. 19, 2017

(30) Foreign Application Priority Data

Apr. 18, 2016 (JP) ................. 2016-082726

(51) Int. Cl.
| | |
|---|---|
| *G02F 1/1333* | (2006.01) |
| *C09K 19/34* | (2006.01) |
| *C09K 19/30* | (2006.01) |
| *G02F 1/1362* | (2006.01) |
| *C09K 19/54* | (2006.01) |
| *C09K 19/04* | (2006.01) |
| *C09K 19/12* | (2006.01) |

(52) U.S. Cl.
CPC .......... *C09K 19/3402* (2013.01); *C09K 19/30* (2013.01); *C09K 19/3003* (2013.01); *C09K 19/3066* (2013.01); *C09K 19/3068* (2013.01); *G02F 1/1362* (2013.01); *C09K 2019/0444* (2013.01); *C09K 2019/0448* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3078* (2013.01); *C09K 2019/3096* (2013.01); *C09K 2019/3422* (2013.01); *C09K 2019/3425* (2013.01); *C09K 2019/548* (2013.01)

(58) Field of Classification Search
USPC ..................................... 252/299.63
See application file for complete search history.

(56) References Cited

U.S. PATENT DOCUMENTS

| | | | | |
|---|---|---|---|---|
| 9,193,907 B2* | 11/2015 | Gotoh | ............... | C09K 19/3066 |
| 9,234,136 B2* | 1/2016 | Archetti | ............... | C09K 19/56 |
| 2014/0138582 A1 | 5/2014 | Gotoh et al. | | |

FOREIGN PATENT DOCUMENTS

JP    2014114276    6/2014

* cited by examiner

Primary Examiner — Geraldina Visconti
(74) Attorney, Agent, or Firm — JCIPRNET

(57) ABSTRACT

Shown is a liquid crystal composition satisfying at least one of characteristics such as a high maximum temperature, a low minimum temperature, a small viscosity, a suitable optical anisotropy and a large dielectric anisotropy, or has a suitable balance regarding at least two of the characteristics, and an AM device including the composition. The liquid crystal composition contains a specific compound having large negative dielectric anisotropy as a first component, and a specific compound having small viscosity as a second component, and may contain a specific compound having negative dielectric anisotropy as a third component, a specific compound having a high maximum temperature or small viscosity as a fourth component or a specific compound having a polymerizable group as an additive component.

14 Claims, No Drawings

US 10,273,410 B2

LIQUID CRYSTAL COMPOSITION AND LIQUID CRYSTAL DISPLAY DEVICE

CROSS-REFERENCE TO RELATED APPLICATION

This application claims the priority benefit of Japan application serial no. 2016-082726, filed on Apr. 18, 2016. The entirety of the above-mentioned patent applications is hereby incorporated by reference herein and made a part of this specification.

TECHNICAL FIELD

The invention relates to a liquid crystal composition, a liquid crystal display device including the composition, and so forth. In particular, the invention relates to a liquid crystal composition having a negative dielectric anisotropy, and a liquid crystal display device that includes the composition and has a mode such as an IPS mode, a VA mode, an FFS mode and an FPA mode. The invention also relates to a liquid crystal display device having a polymer sustained alignment mode.

BACKGROUND ART

In a liquid crystal display device, a classification based on an operating mode for liquid crystal molecules includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode and a field-induced photo-reactive alignment (FPA) mode. A classification based on a driving mode in the device includes a passive matrix (PM) and an active matrix (AM). The PM is classified into static, multiplex and so forth, and the AM is classified into a thin film transistor (TFT), a metal insulator metal (MIM) and so forth. The TFT is further classified into amorphous silicon and polycrystal silicon. The latter is classified into a high temperature type and a low temperature type based on a production process. A classification based on a light source includes a reflective type utilizing natural light, a transmissive type utilizing backlight and a transflective type utilizing both the natural light and the backlight.

The liquid crystal display device includes a liquid crystal composition having a nematic phase. The composition has suitable characteristics. An AM device having good characteristics can be obtained by improving characteristics of the composition. Table 1 below summarizes a relationship in two characteristics. The characteristics of the composition will be further described based on a commercially available AM device. A temperature range of the nematic phase relates to a temperature range in which the device can be used. A preferred maximum temperature of the nematic phase is about 70° C. or higher, and a preferred minimum temperature of the nematic phase is about −10° C. or lower. Viscosity of the composition relates to a response time of the device. A short response time is preferred for displaying moving images on the device. A shorter response time even by one millisecond is desirable. Accordingly, a small viscosity in the composition is preferred. A small viscosity at a low temperature is further preferred.

TABLE 1

Characteristics of Composition and AM Device

| No. | Characteristics of Composition | Characteristics of AM Device |
|---|---|---|
| 1 | Wide temperature range of a nematic phase | Wide usable temperature range |
| 2 | Small viscosity | Short response time |
| 3 | Suitable optical anisotropy | Large contrast ratio |
| 4 | Large positive or negative dielectric anisotropy | Low threshold voltage and small electric power consumption Large contrast ratio |
| 5 | Large specific resistance | Large voltage holding ratio and large contrast ratio |
| 6 | High stability to ultraviolet light and heat | Long service life |

An optical anisotropy of the composition relates to a contrast ratio in the device. According to a mode of the device, a large optical anisotropy or a small optical anisotropy, more specifically, a suitable optical anisotropy is required. A product (Δn×d) of the optical anisotropy (Δn) of the composition and a cell gap (d) in the device is designed so as to maximize the contrast ratio. A suitable value of the product depends on a type of the operating mode. In a device having the VA mode, the suitable value is in the range of about 0.30 micrometer to about 0.40 micrometer, and in a device having the IPS mode or the FFS mode, the suitable value is in the range of about 0.20 micrometer to about 0.30 micrometer. In the above case, a composition having the large optical anisotropy is preferred for a device having a small cell gap. A large dielectric anisotropy in the composition contributes to a low threshold voltage, a small electric power consumption and a large contrast ratio in the device. Accordingly, the large dielectric anisotropy is preferred. A large specific resistance in the composition contributes to a large voltage holding ratio and a large contrast ratio in the device. Accordingly, a composition having the large specific resistance at room temperature and also at a temperature close to a maximum temperature of the nematic phase in an initial stage is preferred. The composition having the large specific resistance at room temperature and also at the temperature close to the maximum temperature of the nematic phase even after the device has been used for a long period of time is preferred. Stability of the composition to ultraviolet light and heat relates to a service life of the device. In the case where the stability is high, the device has a long service life. Such characteristics are preferred for an AM device used in a liquid crystal projector, a liquid crystal television and so forth.

In a liquid crystal display device having a polymer sustained alignment (PSA) mode, a liquid crystal composition containing a polymer is used. First, a composition to which a small amount of a polymerizable compound is added is injected into the device. Next, the composition is irradiated with ultraviolet light while voltage is applied between substrates of the device. The polymerizable compound is polymerized to form a network structure of the polymer in the composition. In the composition, alignment of liquid crystal molecules can be controlled by the polymer, and therefore the response time of the device is shortened and also image persistence is improved. Such an effect of the polymer can be expected for a device having the mode such as the TN mode, the ECB mode, the OCB mode, the IPS mode, the VA mode, the FFS mode and the FPA mode.

A composition having positive dielectric anisotropy is used in an AM device having the TN mode. A composition having negative dielectric anisotropy is used in an AM device having the VA mode. A composition having positive or negative dielectric anisotropy is used in an AM device having the IPS mode or the FFS mode. In an AM device having polymer sustained alignment mode, a composition having positive or negative dielectric anisotropy is used. Example of a first component in the invention is disclosed in Patent literature No. 1 described below.

CITATION LIST

Patent Literature

Patent literature No. 1: JP 2014-114276 A.

SUMMARY OF INVENTION

Technical Problem

The invention provides a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, a high stability to ultraviolet light and a high stability to heat. The invention further provides a liquid crystal composition having a suitable balance regarding at least two of the characteristics. The invention also provides a liquid crystal display device including such a composition. The invention yet further provides an AM device having characteristics such as a short response time, a large voltage holding ratio, a low threshold voltage, a large contrast ratio and a long service life.

Solution to Problem

The invention concerns a liquid crystal composition that has a nematic phase and a negative dielectric anisotropy, and contains at least one compound selected from the group of compounds represented by formula (1) as a first component and at least one compound selected from the group of compounds represented by formula (2) as a second component, and a liquid crystal display device including the composition:

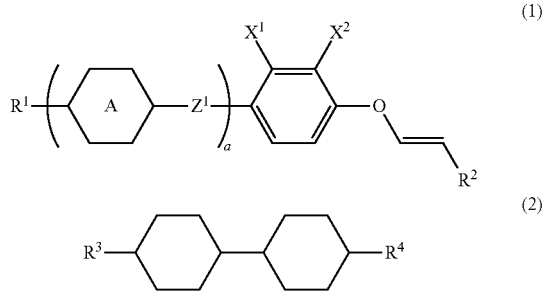

wherein, in formula (1) and formula (2), $R^1$ and $R^3$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one piece of hydrogen is replaced by fluorine or chlorine; $R^2$ is alkyl having 1 to 12 carbons; $R^4$ is alkenyl having 2 to 12 carbons; ring A is 1,4-cyclohexylene, 1,4-cyclohexenylene, tetrahydropyran-2,5-diyl, 1,4-phenylene, 1,4-phenylene in which at least one piece of hydrogen is replaced by fluorine or chlorine, naphthalene-2,6-diyl, naphthalene-2,6-diyl in which at least one piece of hydrogen is replaced by fluorine or chlorine, chroman-2,6-diyl, or chroman-2,6-diyl in which at least one piece of hydrogen is replaced by fluorine or chlorine; $Z^1$ is a single bond, ethylene, carbonyloxy or methyleneoxy; $X^1$ and $X^2$ are independently fluorine or chlorine; and a is 1, 2 or 3.

Advantageous Effects of Invention

One of advantages of the invention is a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, a high stability to ultraviolet light and a high stability to heat. Another advantage is a liquid crystal composition having a suitable balance regarding at least two of characteristics. Another advantage is a liquid crystal display device including such a composition. Another advantage is an AM device having characteristics such as a short response time, a large voltage holding ratio, a low threshold voltage, a large contrast ratio and a long service life.

DESCRIPTION OF EMBODIMENTS

Usage of terms herein is as described below. Terms "liquid crystal composition" and "liquid crystal display device" may be occasionally abbreviated as "composition" and "device," respectively. "Liquid crystal display device" is a generic term for a liquid crystal display panel and a liquid crystal display module. "Liquid crystal compound" is a generic term for a compound having a liquid crystal phase such as a nematic phase and a smectic phase, and a compound having no liquid crystal phase but being mixed with the composition for the purpose of adjusting characteristics such as a temperature range of the nematic phase, viscosity and a dielectric anisotropy. The compound has a six-membered ring such as 1,4-cyclohexylene and 1,4-phenylene, and has rod-like molecular structure. "Polymerizable compound" is a compound to be added for the purpose of forming a polymer in the composition.

The liquid crystal composition is prepared by mixing a plurality of liquid crystal compounds. A proportion (content) of the liquid crystal compounds is expressed in terms of weight percent (% by weight) based on the total amount of the liquid crystal composition. An additive such as an optically active compound, an antioxidant, an ultraviolet light absorber, a dye, an antifoaming agent, the polymerizable compound, a polymerization initiator and a polymerization inhibitor is added to the liquid crystal composition when necessary. A proportion (amount of addition) of the additive is expressed in terms of weight percent (% by weight) based on the total amount of the liquid crystal composition in a manner identical to the proportion of the liquid crystal compounds. Weight parts per million (ppm) may be occasionally used. A proportion of the polymerization initiator and the polymerization inhibitor is exceptionally expressed based on the total amount of the polymerizable compound.

"Maximum temperature of the nematic phase" may be occasionally abbreviated as "maximum temperature." "Minimum temperature of the nematic phase" may be occasionally abbreviated as "minimum temperature." An expression "having a large specific resistance" means that the composition has a large specific resistance at room temperature and also at a temperature close to the maximum temperature of the nematic phase in an initial stage, and the composition has the large specific resistance at room temperature and also at a temperature close to the maximum temperature of the nematic phase even after the device has been used for a long period of time. An expression "having a large voltage holding ratio" means that the device has a large voltage holding ratio at room temperature and also at a temperature close to the maximum temperature of the nematic phase in the initial stage, and the device has the large voltage holding ratio at room temperature and also at a temperature close to the maximum temperature of the nematic phase even after the device has been used for the long period of time. An expression "increase the dielectric anisotropy" means that a value of dielectric anisotropy positively increases in a composition having positive dielectric anisotropy, and the value of dielectric anisotropy negatively increases in a composition having negative dielectric anisotropy.

A compound represented by formula (1) may be occasionally abbreviated as "compound (1)." At least one compound selected from the group of compounds represented by formula (2) may be occasionally abbreviated as "compound (2)." "Compound (1)" means one compound, a mixture of two compounds or a mixture of three or more compounds represented by formula (1). A same rule applies also to any other compound represented by any other formula. An expression "at least one piece of 'A'" means that the number of 'A' is arbitrary. An expression "at least one piece of 'A' may be replaced by 'B'" means that, when the number of 'A' is 1, a position of 'A' is arbitrary, and also when the number of 'A' is 2 or more, positions thereof can be selected without restriction. A same rule applies also to an expression "at least one piece of 'A' is replaced by 'B'."

A symbol of terminal group $R^1$ is used in a plurality of compounds in chemical formulas of component compounds. In the compounds, two groups represented by two pieces of arbitrary $R^1$ may be identical or different. For example, in one case, $R^1$ of compound (1-1) is ethyl and $R^1$ of compound (1-2) is ethyl. In another case, $R^1$ of compound (1-1) is ethyl and $R^1$ of compound (1-2) is propyl. A same rule applies also to a symbol of any other terminal group or the like. In formula (1), when a is 2, two of ring A exists. In the compound, two rings represented by two of ring A may be identical or different. A same rule applies also to two of arbitrary ring A when a is larger than 2. A same rule applies also to a symbol of $Z^1$, ring B or the like. A same rule applies also to such a case where two pieces of -$Sp^2$-$P^5$ exists in compound (5-27).

Then, 2-fluoro-1,4-phenylene means two divalent groups described below. In a chemical formula, fluorine may be leftward (L) or rightward (R). A same rule applies also to a left-right asymmetrical divalent group derived from a ring such as tetrahydropyran-2,5-diyl. A same rule applies also to a divalent bonding group such as carbonyloxy (—COO— or —OCO—).

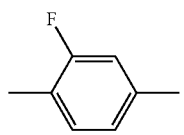

(L)

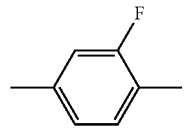

(R)

The invention includes items described below.

Item 1. A liquid crystal composition that has a nematic phase and a negative dielectric anisotropy, and contains at least one compound selected from the group of compounds represented by formula (1) as a first component, and at least one compound selected from the group of compounds represented by formula (2) as a second component:

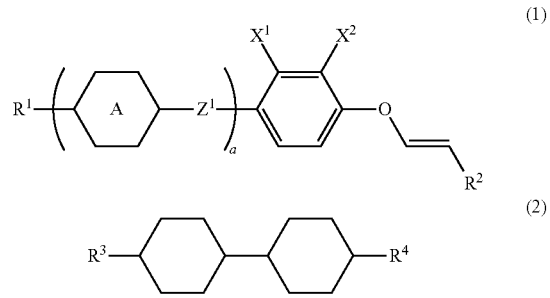

wherein, in formula (1) and formula (2), $R^1$ and $R^3$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one piece of hydrogen is replaced by fluorine or chlorine; $R^2$ is alkyl having 1 to 12 carbons; $R^4$ is alkenyl having 2 to 12 carbons; ring A is 1,4-cyclohexylene, 1,4-cyclohexenylene, tetrahydropyran-2,5-diyl, 1,4-phenylene, 1,4-phenylene in which at least one piece of hydrogen is replaced by fluorine or chlorine, naphthalene-2,6-diyl, naphthalene-2,6-diyl in which at least one piece of hydrogen is replaced by fluorine or chlorine, chroman-2,6-diyl, or chroman-2,6-diyl in which at least one piece of hydrogen is replaced by fluorine or chlorine; $Z^1$ is a single bond, ethylene, carbonyloxy or methyleneoxy; $X^1$ and $X^2$ are independently fluorine or chlorine; and a is 1, 2 or 3.

Item 2. The liquid crystal composition according to item 1, containing at least one compound selected from the group of compounds represented by formula (1-1) to formula (1-19) as the first component:

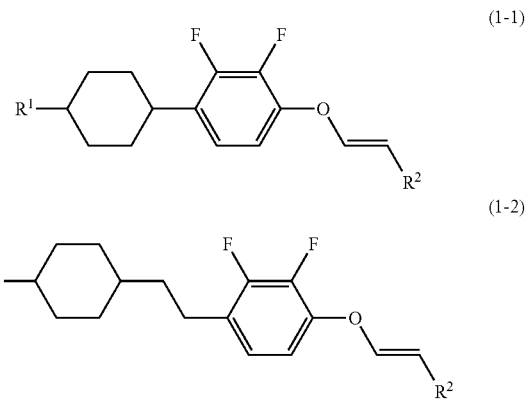

(1-3) 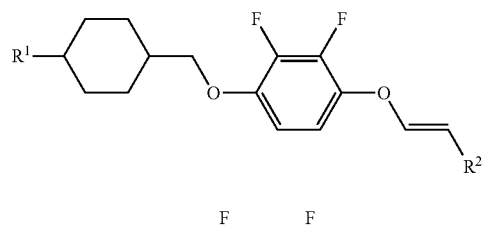
(1-4) 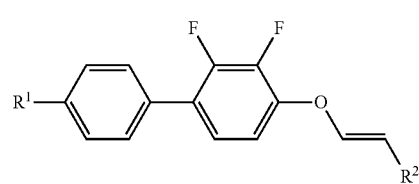
(1-5) 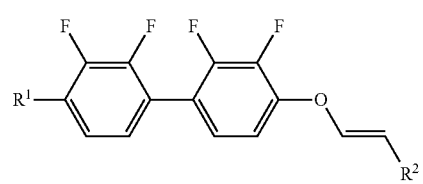
(1-6) 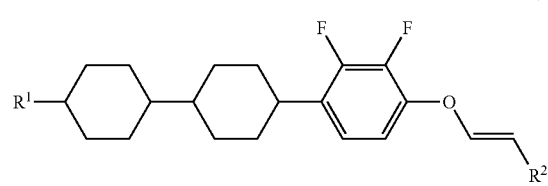
(1-7) 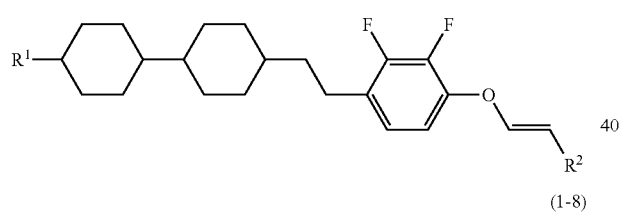
(1-8) 
(1-9) 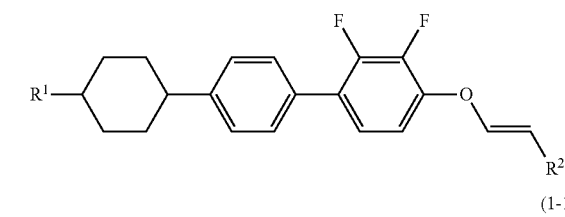
(1-10) 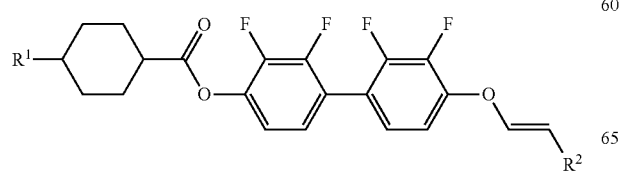
(1-11) 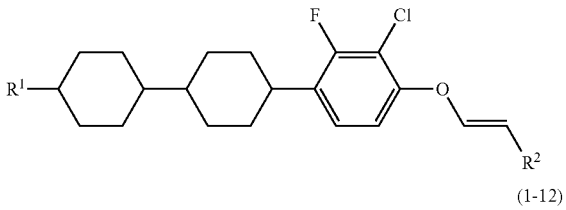
(1-12) 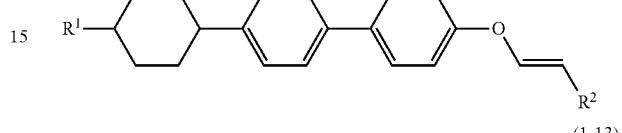
(1-13) 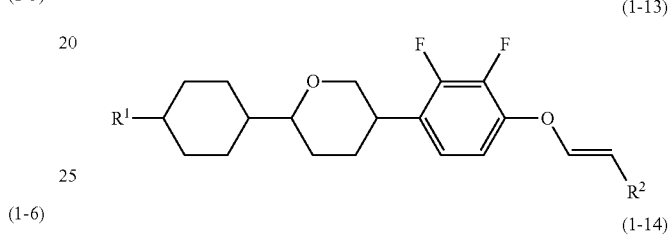
(1-14) 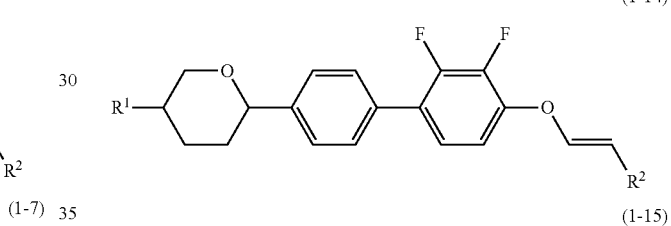
(1-15) 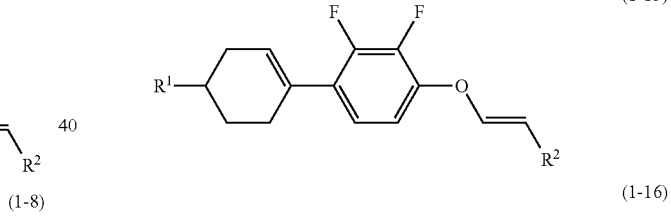
(1-16) 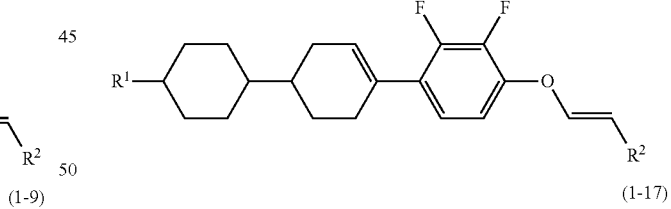
(1-17) 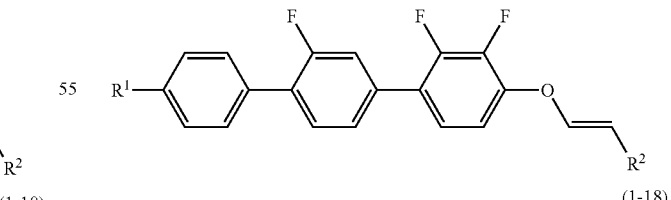
(1-18) 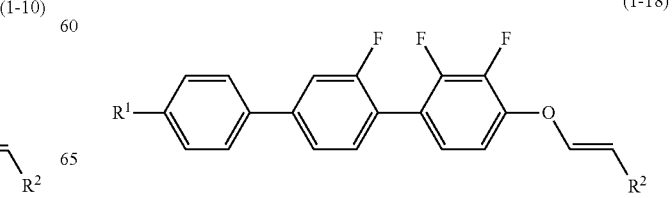

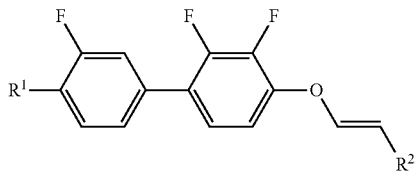
(1-19)

wherein, in formula (1-1) to formula (1-19), $R^1$ is alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one piece of hydrogen is replaced by fluorine or chlorine; and $R^2$ is alkyl having 1 to 12 carbons.

Item 3. The liquid crystal composition according to item 1 or 2, wherein a proportion of the first component is in the range of 3% by weight to 30% by weight, and a proportion of the second component is in the range of 15% by weight to 70% by weight, based on the total weight of the liquid crystal composition.

Item 4. The liquid crystal composition according to any one of items 1 to 3, containing at least one compound selected from the group of compounds represented by formula (3) as a third component:

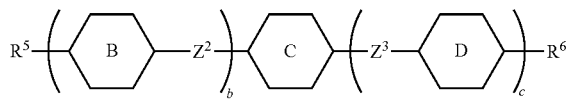
(3)

wherein, in formula (3), $R^5$ and $R^6$ are independently alkyl having 1 to 12 carbons, alkoxy having 1 to 12 carbons, alkenyl having 2 to 12 carbons, or alkyl having 1 to 12 carbons in which at least one piece of hydrogen is replaced by fluorine or chlorine; ring B and ring D are independently 1,4-cyclohexylene, 1,4-cyclohexenylene, tetrahydropyran-2,5-diyl, 1,4-phenylene, 1,4-phenylene in which at least one piece of hydrogen is replaced by fluorine or chlorine, naphthalene-2, 6-diyl, naphthalene-2, 6-diyl in which at least one piece of hydrogen is replaced by fluorine or chlorine, chroman-2,6-diyl, or chroman-2,6-diyl in which at least one piece of hydrogen is replaced by fluorine or chlorine; ring C is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7, 8-difluorochroman-2,6-diyl; $Z^2$ and $Z^3$ are independently a single bond, ethylene, carbonyloxy or methyleneoxy; b is 1, 2 or 3; c is 0 or 1; and a sum of b and c is 3 or less.

Item 5. The liquid crystal composition according to any one of items 1 to 4, containing at least one compound selected from the group of compounds represented by formula (3-1) to formula (3-22) as the third component:

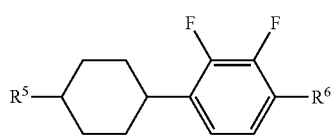
(3-1)

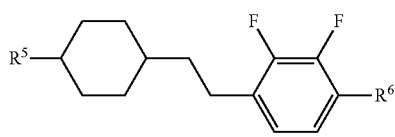
(3-2)

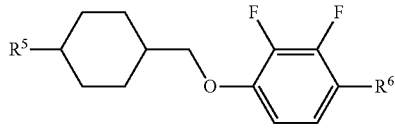
(3-3)

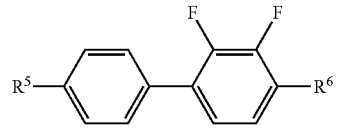
(3-4)

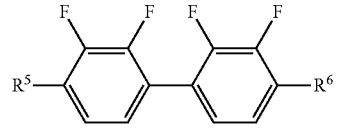
(3-5)

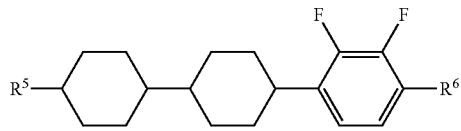
(3-6)

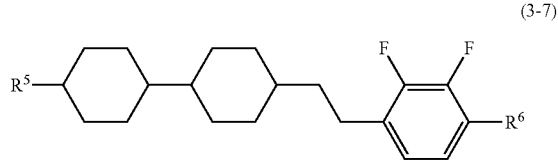
(3-7)

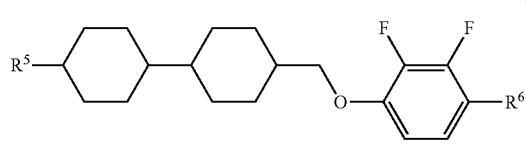
(3-8)

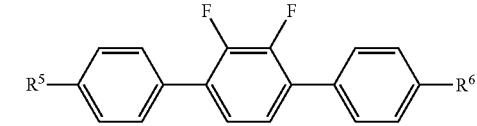
(3-9)

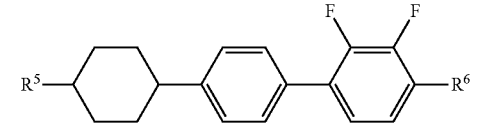
(3-10)

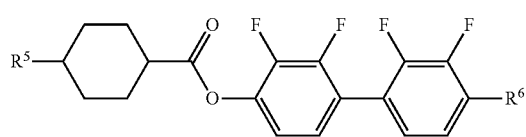
(3-11)

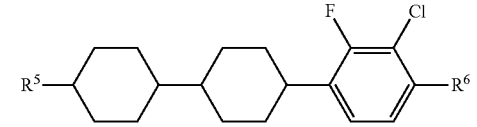
(3-12)

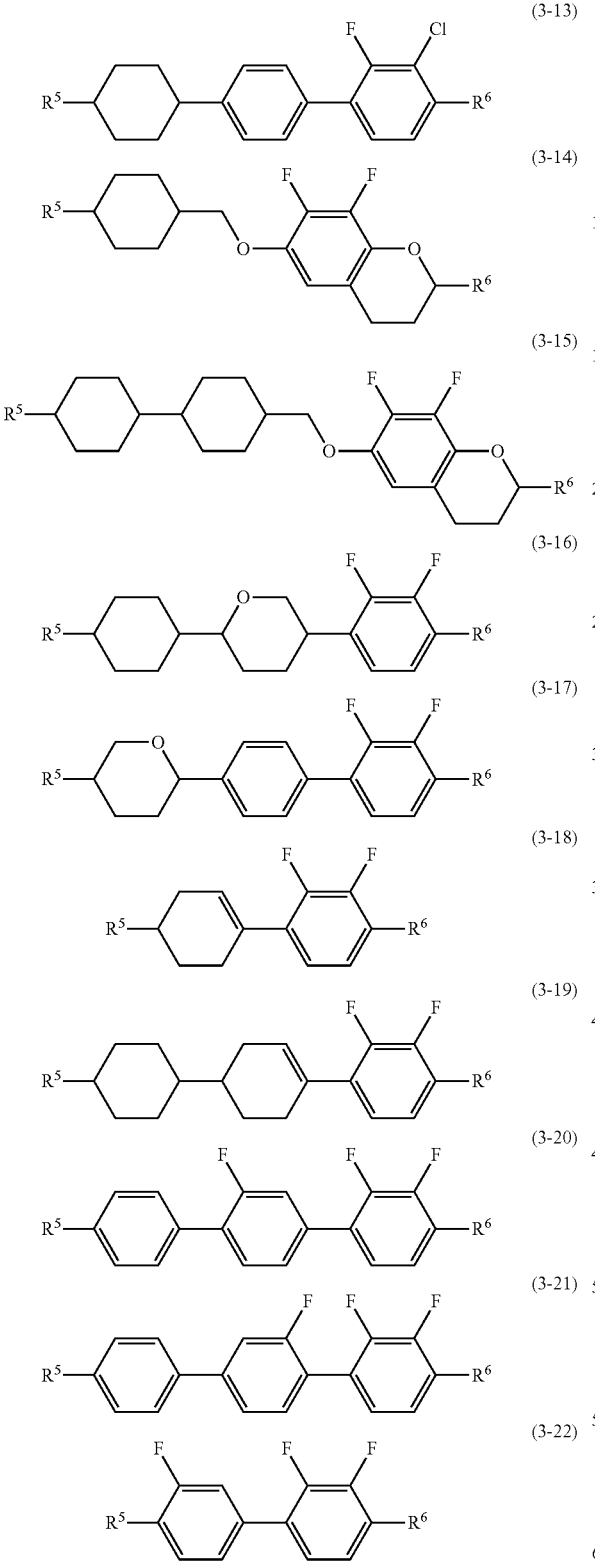

wherein, in formula (3-1) to formula (3-22), $R^5$ and $R^6$ are independently alkyl having 1 to 12 carbons, alkoxy having 1 to 12 carbons, alkenyl having 2 to 12 carbons, or alkyl having 1 to 12 carbons in which at least one piece of hydrogen is replaced by fluorine or chlorine.

Item 6. The liquid crystal composition according to any one of items 1 to 5, containing at least one compound selected from the group of compounds represented by formula (4) as a fourth component:

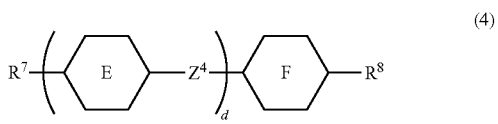

(4)

wherein, in formula (4), $R^7$ and $R^8$ are independently alkyl having 1 to 12 carbons, alkoxy having 1 to 12 carbons, alkenyl having 2 to 12 carbons, alkyl having 1 to 12 carbons in which at least one piece of hydrogen is replaced by fluorine or chlorine, or alkenyl having 2 to 12 carbons in which at least one piece of hydrogen is replaced by fluorine or chlorine; ring E and ring F are independently 1,4-cyclohexylene, 1,4-phenylene, 2-fluoro-1,4-phenylene or 2,5-difluoro-1,4-phenylene; $Z^4$ is a single bond, ethylene or carbonyloxy; and d is 1, 2 or 3. Herein, when d is 1 and $Z^4$ is a single bond, ring F is 1,4-phenylene, 2-fluoro-1,4-phenylene or 2,5-difluoro-1,4-phenylene.

Item 7. The liquid crystal composition according to any one of items 1 to 6, containing at least one compound selected from the group of compounds represented by formula (4-1) to formula (4-12) as the fourth component:

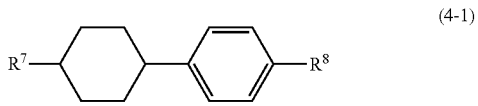

(4-1)

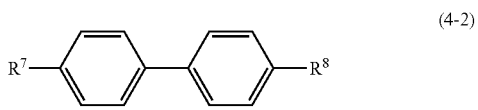

(4-2)

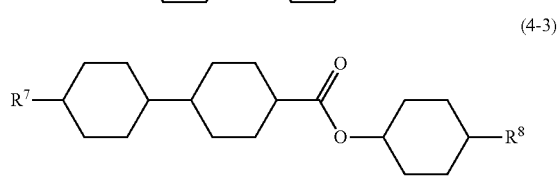

(4-3)

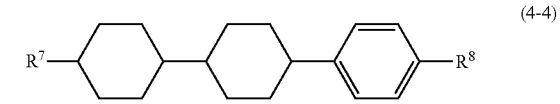

(4-4)

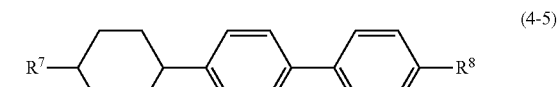

(4-5)

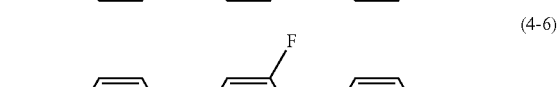

(4-6)

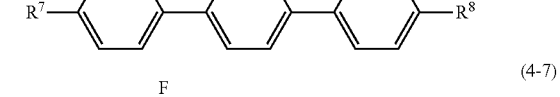

(4-7)

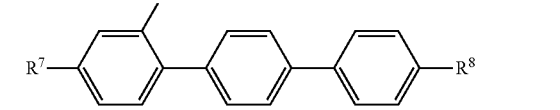

-continued

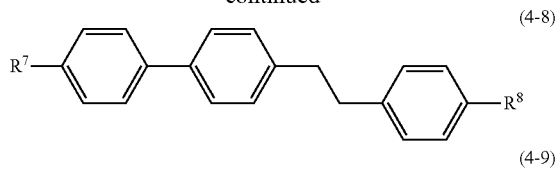
(4-8)

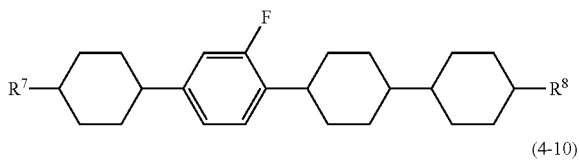
(4-9)

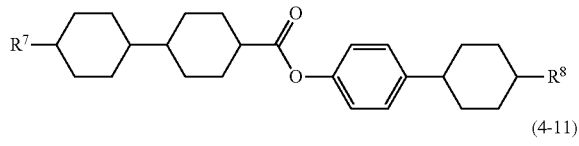
(4-10)

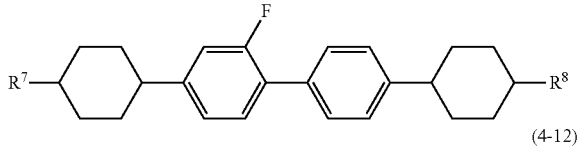
(4-11)

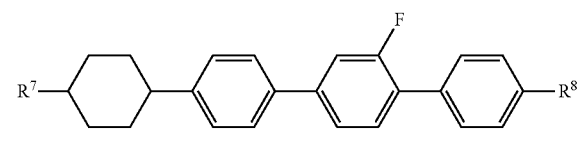
(4-12)

wherein, in formula (4-1) to formula (4-12), $R^7$ and $R^8$ are independently alkyl having 1 to 12 carbons, alkoxy having 1 to 12 carbons, alkenyl having 2 to 12 carbons, alkyl having 1 to 12 carbons in which at least one piece of hydrogen is replaced by fluorine or chlorine, or alkenyl having 2 to 12 carbons in which at least one piece of hydrogen is replaced by fluorine or chlorine.

Item 8. The liquid crystal composition according to item 4 or 5, wherein a proportion of the third component is in the range of 20% by weight to 80% by weight based on the total amount of the liquid crystal composition.

Item 9. The liquid crystal composition according to item 6 or 7, wherein a proportion of the fourth component is in the range of 2% by weight to 30% by weight based on the total amount of the liquid crystal composition.

Item 10. The liquid crystal composition according to any one of items 1 to 9, containing at least one polymerizable compound selected from the group of compounds represented by formula (5) as an additive component:

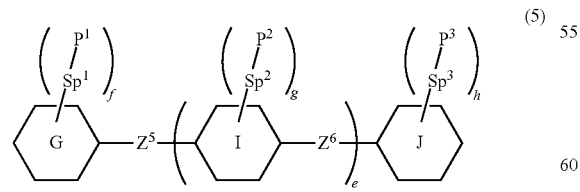
(5)

wherein, in formula (5), ring G and ring J are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine; ring I is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine; $Z^5$ and $Z^6$ are independently a single bond or alkylene having 1 to 10 carbons, and in the alkylene, at least one piece of —CH$_2$— may be replaced by —O—, —CO—, —COO— or —OCO—, and at least one piece of —CH$_2$—CH$_2$— may be replaced by —CH=CH—, —C(CH$_3$)=CH—, —CH=C(CH$_3$)— or —C(CH$_3$)=C(CH$_3$)—, and in the groups, at least one piece of hydrogen may be replaced by fluorine or chlorine; $P^1$, $P^2$ and $P^3$ are independently a polymerizable group; $Sp^1$, $Sp^2$ and $Sp^3$ are independently a single bond or alkylene having 1 to 10 carbons, and in the alkylene, at least one piece of —CH$_2$— may be replaced by —O—, —COO—, —OCO— or —OCOO—, and at least one piece of —CH$_2$—CH$_2$— may be replaced by —CH=CH— or —C≡C—, and in the groups, at least one piece of hydrogen may be replaced by fluorine or chlorine; e is 0, 1, or 2; f, g and h are independently 0, 1, 2, 3 or 4; and a sum of f, g and h is 1 or more.

Item 11. The liquid crystal composition according to item 10, wherein, in formula (5), $P^1$, $P^2$ and $P^3$ are independently a polymerizable group selected from the group of groups represented by formula (P-1) to formula (P-6):

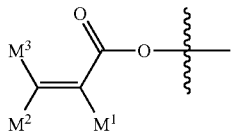
(P-1)

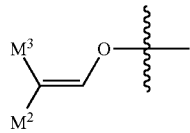
(P-2)

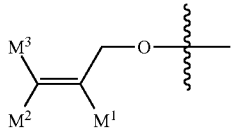
(P-3)

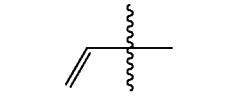
(P-4)

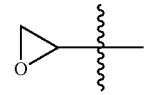
(P-5)

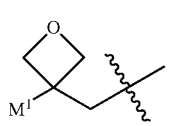
(P-6)

wherein, in formula (P-1) to formula (P-6), $M^1$, $M^2$ and $M^3$ are independently hydrogen, fluorine, alkyl having 1 to 5 carbons, or alkyl having 1 to 5 carbons in which at least one piece of hydrogen is replaced by fluorine or chlorine; and in formula (5), when all of f pieces of $P^1$ and h pieces of $P^3$ are the group represented by formula (P-4), at least one of f pieces of $Sp^1$ and h pieces of Sp' is alkylene in which at least one piece of —$CH_2$— is replaced by —O—, —COO—, —OCO— or —OCOO—.

Item 12. The liquid crystal composition according to any one of items 1 to 11, containing at least one polymerizable compound selected from the group of compounds represented by formula (5-1) to formula (5-27) as the additive component:

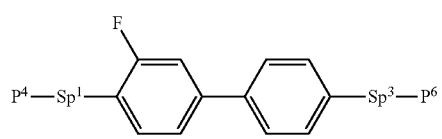
(5-1)

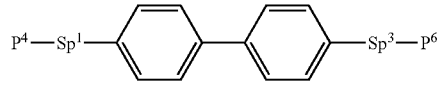
(5-2)

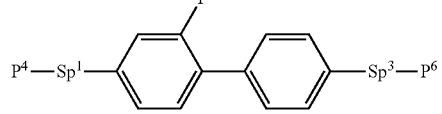
(5-3)

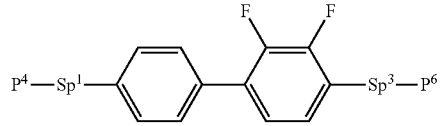
(5-4)

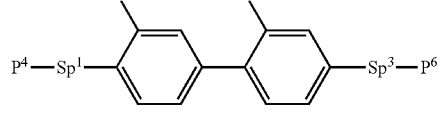
(5-5)

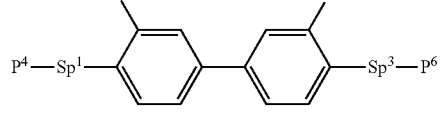
(5-6)

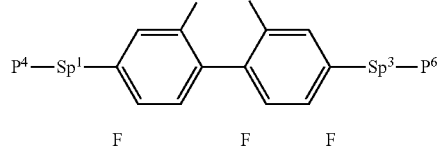
(5-7)

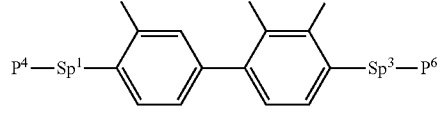
(5-8)

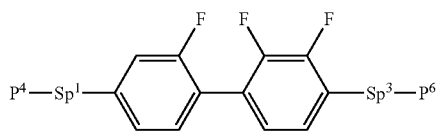
(5-9)

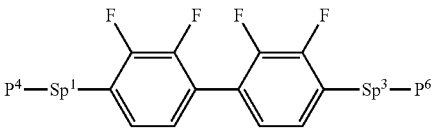
(5-10)

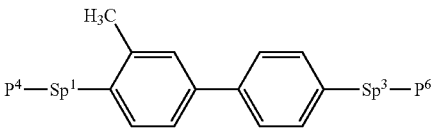
(5-11)

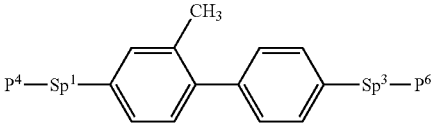
(5-12)

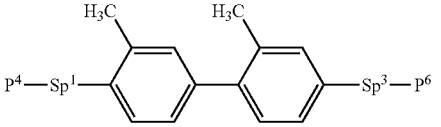
(5-13)

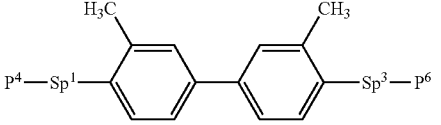
(5-14)

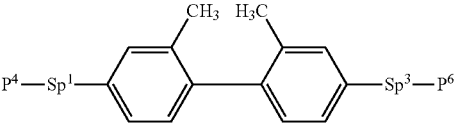
(5-15)

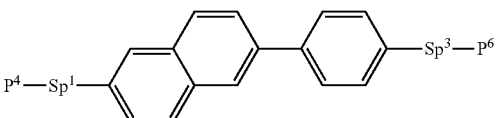
(5-16)

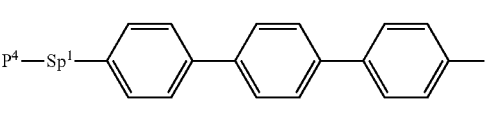
(5-17)

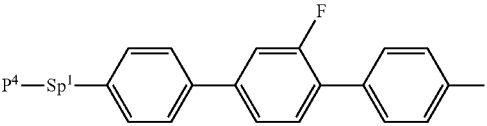
(5-18)

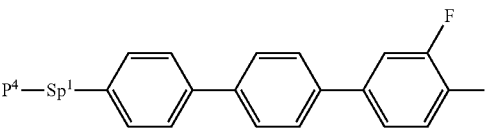
(5-19)

(5-20)
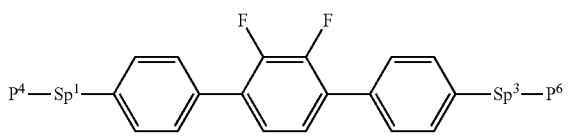

(5-21)
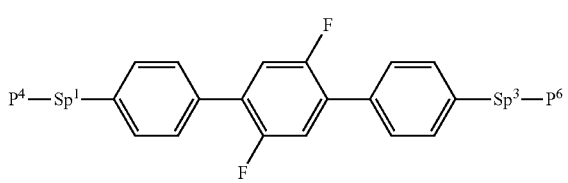

(5-22)
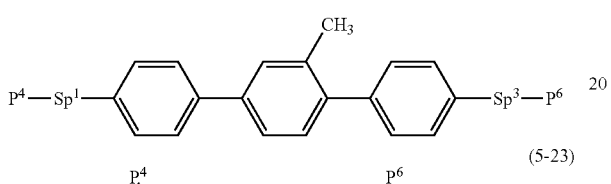

(5-23)
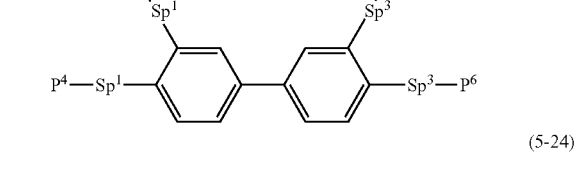

(5-24)
(5-25)
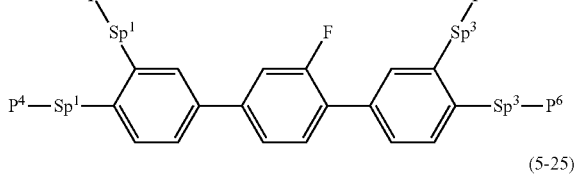

(5-26)
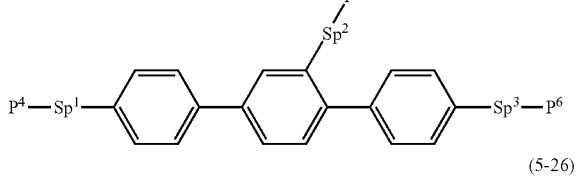

(5-27)
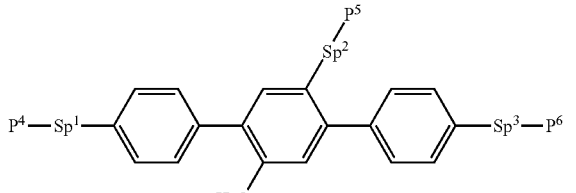

wherein, in formula (5-1) to formula (5-27), $P^4$, $P^5$ and $P^6$ are independently a polymerizable group selected from the group of groups represented by formula (P-1) to formula (P-3); and (P-1)
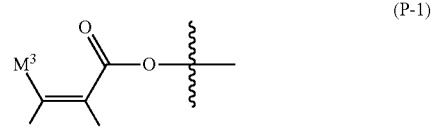

(P-2)
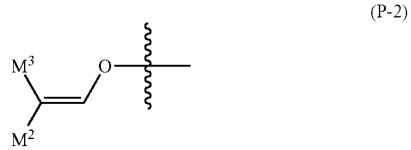

(P-3)
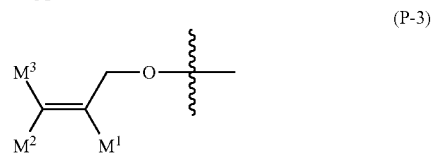

wherein, in formula (P-1) to formula (P-3), $M^1$, $M^2$ and $M^3$ are independently hydrogen, fluorine, alkyl having 1 to 5 carbons, or alkyl having 1 to 5 carbons in which at least one piece of hydrogen is replaced by fluorine or chlorine; and in formula (5-1) to formula (5-27), $Sp^1$, $Sp^2$ and $Sp^3$ are independently a single bond or alkylene having 1 to 10 carbons, and in the alkylene, at least one piece of —CH$_2$— may be replaced by —O—, —COO—, —OCO— or —OCOO—, and at least one piece of —CH$_2$—CH$_2$— may be replaced by —CH=CH— or —C≡C—, and in the groups, at least one piece of hydrogen may be replaced by fluorine or chlorine.

Item 13. The liquid crystal composition according to any one of items 10 to 12, wherein a proportion of addition of the additive component is in the range of 0.03% by weight to 10% by weight based on the total amount of the liquid crystal composition.

Item 14. A liquid crystal display device, including the liquid crystal composition according to any one of items 1 to 13.

Item 15. The liquid crystal display device according to item 14, wherein an operating mode in the liquid crystal display device includes an IPS mode, a VA mode, an FFS mode or an FPA mode, and a driving mode in the liquid crystal display device includes an active matrix mode.

Item 16. A polymer sustained alignment mode liquid crystal display device, wherein the liquid crystal display device includes the liquid crystal composition according to any one of items 1 to 13, or the polymerizable compound in the liquid crystal composition is polymerized.

Item 17. Use of the liquid crystal composition according to any one of items 1 to 13 in a liquid crystal display device.

Item 18. Use of the liquid crystal composition according to any one of items 1 to 13 in a polymer sustained alignment mode liquid crystal display device.

The invention further includes the following items: (a) the composition, further containing at least one of additives such as an optically active compound, an antioxidant, an ultraviolet light absorber, a dye, an antifoaming agent, a polymerizable compound, a polymerization initiator or a polymerization inhibitor; (b) an AM device including the composition; (c) the composition further containing a polymerizable compound, and a polymer sustained alignment (PSA) mode AM device including the composition; (d) a polymer sustained alignment (PSA) mode AM device, wherein the device includes the composition, and a polymerizable compound in the composition is polymerized; (e) a device including the composition and having the PC mode, the TN mode, the STN mode, the ECB mode, the OCB mode, the IPS mode, the VA mode, the FFS mode or the FPA mode; (f) a transmissive device including the composition; (g) use of the composition as the composition having the nematic phase; and (h) use as an optically active composition by adding the optically active compound to the composition.

The composition of the invention will be described in the following order. First, a constitution of the component compounds in the composition will be described. Second, main characteristics of the component compounds and main effects of the compounds on the composition will be described. Third, a combination of components in the composition, a preferred proportion of the components and the basis thereof will be described. Fourth, a preferred embodiment of the component compounds will be described. Fifth, a preferred component compound will be described. Sixth, an additive that may be added to the composition will be described. Seventh, methods for synthesizing the component compounds will be described. Last, an application of the composition will be described.

First, the constitution of the component compounds in the composition will be described. The composition of the invention is classified into composition A and composition B. Composition A may further contain any other liquid crystal compound, an additive or the like in addition to the liquid crystal compound selected from compound (1), compound (2), compound (3) and compound (4). An expression "any other liquid crystal compound" means a liquid crystal compound different from compound (1), compound (2), compound (3) and compound (4). Such a compound is mixed with the composition for the purpose of further adjusting the characteristics. The additive includes the optically active compound, the antioxidant, the ultraviolet light absorber, the dye, the antifoaming agent, the polymerizable compound, the polymerization initiator and the polymerization inhibitor.

Composition B consists essentially of liquid crystal compounds selected from compound (1), compound (2), compound (3) and compound (4). An expression "essentially" means that the composition may contain the additive, but contains no any other liquid crystal compound. Composition B has a smaller number of components than composition A has. Composition B is preferred to composition A in view of cost reduction. Composition A is preferred to composition B in view of possibility of further adjusting the characteristics by mixing any other liquid crystal compound.

Second, the main characteristics of the component compounds and the main effects of the compounds on the characteristics of the composition will be described. The main characteristics of the component compounds are summarized in Table 2 on the basis of advantageous effects of the invention. In Table 2, a symbol L stands for "large" or "high," a symbol M stands for "medium," and a symbol S stands for "small" or "low." The symbols L, M and S represent a classification based on a qualitative comparison among the component compounds, and 0 (zero) means "a value is zero" or "a value close to zero."

TABLE 2

| Characteristics of Compounds | | | | |
|---|---|---|---|---|
| | Compounds | | | |
| | Compound (1) | Compound (2) | Compound (3) | Compound (4) |
| Maximum temperature | S to L | S to M | S to L | S to L |
| Viscosity | M to L | S | M to L | S to M |
| Optical anisotropy | M to L | S | M to L | S to L |
| Dielectric anisotropy | M to L[1)] | 0 | M to L[1)] | 0 |
| Specific resistance | L | L | L | L |

[1)] A value of dielectric anisotropy is negative, and the symbol shows magnitude of an absolute value.

Upon mixing the component compounds with the composition, the main effects of the component compounds on the characteristics of the composition are as described below. Compound (1) increases the dielectric anisotropy. Compound (2) decreases the viscosity. Compound (3) increases the dielectric anisotropy and decreases the minimum temperature. Compound (4) increases the maximum temperature or decreases the viscosity. Compound (5) is polymerized to give a polymer, and the polymer shortens the response time in the device, and improves image persistence.

Third, the combination of components in the composition, the preferred proportion of the component compounds and the basis thereof will be described. A preferred combination of components in the composition includes a combination of the first component and the second component, a combination of the first component, the second component and the third component, a combination of the first component, the second component and the fourth component, a combination of the first component, the second component, the third component and the fourth component, a combination of the first component, the second component and the additive component, a combination of the first component, the second component, the third component and the additive component, a combination of the first component, the second component, the fourth component and the additive component, or a combination of the first component, the second component, the third component, the fourth component and the additive component. A further preferred combination of components includes a combination of the first component, the second component and the third component, a combination of the first component, the second component, the third component and the fourth component, a combination of the first component, the second component, the third component and the additive component, or a combination of the first component, the second component, the third component, the fourth component and the additive component.

A preferred proportion of the first component is about 3% by weight or more for increasing the dielectric anisotropy, and about 30% by weight or less for decreasing the minimum temperature. A further preferred proportion is in the range of about 3% by weight to about 20% by weight. A particularly preferred proportion is in the range of about 5% by weight to about 15% by weight.

A preferred proportion of the second component is about 15% by weight or more for decreasing the viscosity, and about 70% by weight or less for increasing the dielectric anisotropy. A further preferred proportion is in the range of about 15% by weight to about 60% by weight. A particularly preferred proportion is in the range of about 20% by weight to about 50% by weight.

A preferred proportion of the third component is about 20% by weight or more for increasing the dielectric anisotropy, and about 80% by weight or less for decreasing the minimum temperature. A further preferred proportion is in the range of about 25% by weight to about 70% by weight. A particularly preferred proportion is in the range of about 30% by weight to about 65% by weight.

A preferred proportion of the fourth component is about 2% by weight or more for increasing the maximum temperature or decreasing the viscosity, and about 30% by weight or less for increasing the dielectric anisotropy. A further preferred proportion is in the range of about 4% by weight to about 25% by weight. A particularly preferred proportion is in the range of about 4% by weight to about 20% by weight.

Compound (5) is added to the composition for the purpose of adapting the composition to the polymer sustained alignment mode device. A preferred proportion of the additive component is about 0.03% by weight or more for aligning the liquid crystal molecules, and about 10% by weight or less for preventing poor display in the device. A further preferred proportion is in the range of about 0.1% by weight to about 2% by weight. A particularly preferred proportion is in the range of about 0.2% by weight to about 1.0% by weight.

Fourth, the preferred embodiment of the component compounds will be described. In formula (1), formula (2), formula (3) and formula (4), $R^1$ and $R^3$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one piece of hydrogen is replaced by fluorine or chlorine. Preferred $R^1$ or $R^3$ is alkyl having 1 to 12 carbons for increasing the stability, and alkoxy having 1 to 12 carbons for increasing the dielectric anisotropy. $R^2$ is alkyl having 1 to 12 carbons. $R^4$ is alkenyl having 2 to 12 carbons. $R^5$ and $R^6$ are independently alkyl having 1 to 12 carbons, alkoxy having 1 to 12 carbons, alkenyl having 2 to 12 carbons, or alkyl having 1 to 12 carbons in which at least one piece of hydrogen is replaced by fluorine or chlorine. Preferred $R^5$ or $R^6$ is alkyl having 1 to 12 carbons for increasing the stability, and alkoxy having 1 to 12 carbons for increasing the dielectric anisotropy. $R^7$ and $R^8$ are independently alkyl having 1 to 12 carbons, alkoxy having 1 to 12 carbons, alkenyl having 2 to 12 carbons, alkyl having 1 to 12 carbons in which at least one piece of hydrogen is replaced by fluorine or chlorine, or alkenyl having 2 to 12 carbons in which at least one piece of hydrogen is replaced by fluorine or chlorine. Preferred $R^7$ or $R^8$ is alkenyl having 2 to 12 carbons for decreasing the viscosity, and alkyl having 1 to 12 carbons for increasing the stability. Alkyl is straight-chain alkyl or branched-chain alkyl, but includes no cyclic alkyl. Straight-chain alkyl is preferred to branched-chain alkyl. A same rule applies also to a terminal group such as alkoxy and alkenyl.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH═CH— in the alkenyl depends on a position of a double bond. Trans is preferred in alkenyl such as 1-propenyl, 1-butenyl, 1-pentenyl, 1-hexenyl, 3-pentenyl and 3-hexenyl for decreasing the viscosity, for instance. Cis is preferred in alkenyl such as 2-butenyl, 2-pentenyl and 2-hexenyl.

Specific examples of preferred alkyl in which at least one piece of hydrogen is replaced by fluorine or chlorine include fluoromethyl, 2-fluoroethyl, 3-fluoropropyl, 4-fluorobutyl, 5-fluoropentyl, 6-fluorohexyl, 7-fluoroheptyl or 8-fluorooctyl. Further preferred examples include 2-fluoroethyl, 3-fluoropropyl, 4-fluorobutyl or 5-fluoropentyl for increasing the dielectric anisotropy.

Specific examples of preferred alkenyl in which at least one piece of hydrogen is replaced by fluorine or chlorine include 2,2-difluorovinyl, 3,3-difluoro-2-propenyl, 4,4-difluoro-3-butenyl, 5,5-difluoro-4-pentenyl or 6,6-difluoro-5-hexenyl. Further preferred examples include 2,2-difluorovinyl or 4,4-difluoro-3-butenyl for decreasing the viscosity.

Ring A, ring B and ring D are independently 1,4-cyclohexylene, 1,4-cyclohexenylene, tetrahydropyran-2,5-diyl, 1,4-phenylene, 1,4-phenylene in which at least one piece of hydrogen is replaced by fluorine or chlorine, naphthalene-2,6-diyl, naphthalene-2,6-diyl in which at least one piece of hydrogen is replaced by fluorine or chlorine, chroman-2,6-diyl, or chroman-2,6-diyl in which at least one piece of hydrogen is replaced by fluorine or chlorine. Preferred ring A, ring B or ring D is 1,4-cyclohexylene for decreasing the viscosity or increasing the maximum temperature, and 1,4-phenylene for decreasing the minimum temperature. With regard to a configuration of 1,4-cyclohexylene, trans is preferred to cis for increasing the maximum temperature. Tetrahydropyran-2,5-diyl includes:

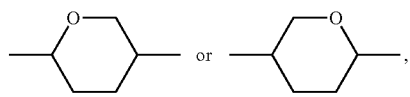

preferably

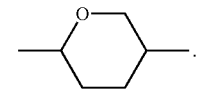

Ring C is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Preferred ring C is 2,3-difluoro-1,4-phenylene for decreasing the viscosity, and 7,8-difluorochroman-2,6-diyl for increasing the dielectric anisotropy.

Ring E and ring F are independently 1,4-cyclohexylene, 1,4-phenylene, 2-fluoro-1,4-phenylene or 2,5-difluoro-1,4-phenylene. Preferred ring E or ring F is 1,4-cyclohexylene for decreasing the viscosity or increasing the maximum temperature, and 1,4-phenylene for increasing the optical anisotropy.

$Z^1$, $Z^2$ and $Z^3$ are independently a single bond, ethylene, carbonyloxy or methyleneoxy. Preferred $Z^1$, $Z^2$ or $Z^3$ is a single bond for decreasing the viscosity, ethylene for decreasing the minimum temperature, and methyleneoxy for increasing the dielectric anisotropy. $Z^4$ is a single bond, ethylene or carbonyloxy. Preferred $Z^4$ is a single bond for increasing the stability.

$X^1$ and $X^2$ are independently fluorine or chlorine. Preferred $X^1$ or $X^2$ is fluorine.

Then, a is 1, 2 or 3. Preferred a is 1 for decreasing the viscosity, and 2 or 3 for increasing the maximum temperature. Then, b is 1, 2 or 3, c is 0 or 1, and a sum of b and c is 3 or less. Preferred b is 1 for decreasing the viscosity, and 2 or 3 for increasing the maximum temperature. Preferred c is 0 for decreasing the viscosity, and 1 for decreasing the minimum temperature. Then, d is 1, 2 or 3. Preferred d is 1 for decreasing the viscosity, and 2 or 3 for increasing the maximum temperature.

In formula (5), $P^1$, $P^2$ and $P^3$ are independently a polymerizable group. Preferred $P^1$, $P^2$ or $P^3$ is a polymerizable group selected from the group of groups represented by formula (P-1) to formula (P-6). Further preferred $P^1$, $P^2$ or $P^3$ is a group represented by formula (P-1), formula (P-2) or formula (P-3). Particularly preferred $P^1$, $P^2$ or $P^3$ is a group represented by formula (P-1) or formula (P-2). Most preferred $P^1$, $P^2$ or $P^3$ is a group represented by formula (P-1). A preferred group represented by formula (P-1) is —OCO—CH═CH$_2$ or —OCO—C(CH$_3$)═CH$_2$. A wavy line in formula (P-1) to formula (P-6) represents a site to form a bonding.

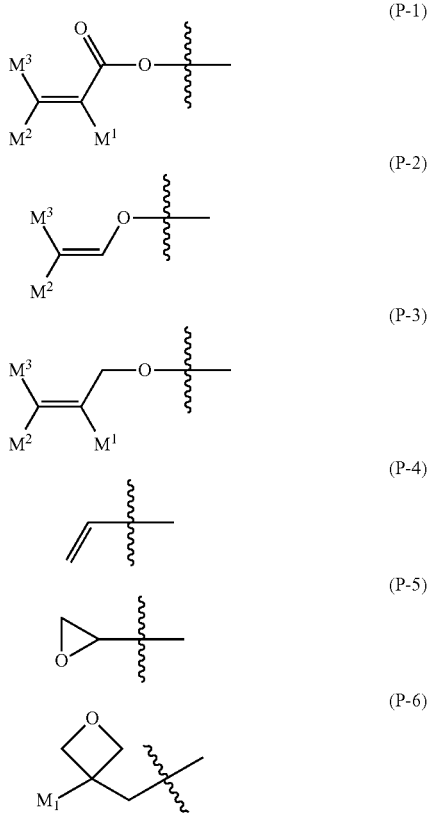

In formula (P-1) to formula (P-6), $M^1$, $M^2$ and $M^3$ are independently hydrogen, fluorine, alkyl having 1 to 5 carbons, or alkyl having 1 to 5 carbons in which at least one piece of hydrogen is replaced by fluorine or chlorine. Preferred $M^1$, $M^2$ or $M^3$ is hydrogen or methyl for increasing reactivity. Further preferred $M^1$ is hydrogen or methyl, and further preferred $M^2$ or $M^3$ is hydrogen.

$Sp^1$, $Sp^2$ and $Sp^3$ are independently a single bond or alkylene having 1 to 10 carbons, and in the alkylene, at least one piece of —CH$_2$— may be replaced by —O—, —COO—, —OCO— or —OCOO—, and at least one piece of —CH$_2$—CH$_2$— may be replaced by —CH═CH— or —C≡C—, and in the groups, at least one piece of hydrogen may be replaced by fluorine or chlorine. Preferred $Sp^1$, $Sp^2$ or $Sp^3$ is a single bond, —CH$_2$—CH$_2$—, —CH$_2$O—, —OCH$_2$—, —COO—, —OCO—, —CO—CH═CH— or —CH═CH—CO—. Further preferred $Sp^1$, $Sp^2$ or $Sp^3$ is a single bond.

In formula (5), when all of f pieces of $P^1$ and h pieces of $P^3$ are the group represented by formula (P-4), at least one of f pieces of $Sp^1$ and h pieces of $Sp^3$ is alkylene having 1 to 10 carbons in which at least one piece of —CH$_2$— is replaced by —O—, —COO—, —OCO— or —OCOO—.

Ring G and ring J are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine. Preferred ring G or ring J is phenyl. Ring I is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine. Preferred ring I is 1,4-phenylene or 2-fluoro-1,4-phenylene.

$Z^5$ and $Z^6$ are independently a single bond or alkylene having 1 to 10 carbons, and in the alkylene, at least one piece of —CH$_2$— may be replaced by —O—, —CO—, —COO— or —OCO—, and at least one piece of —CH$_2$—CH$_2$— may be replaced by —CH═CH—, —C(CH$_3$)═CH—, —CH═C(CH$_3$)— or —C(CH$_3$)═C(CH$_3$)—, and in the groups, at least one piece of hydrogen may be replaced by fluorine or chlorine. Preferred $Z^5$ or $Z^6$ is a single bond, —CH$_2$—CH$_2$—, —CH$_2$O—, —OCH$_2$—, —COO— or —OCO—. Further preferred $Z^5$ or $Z^6$ is a single bond.

Then, e is 0, 1 or 2. Preferred e is 0 or 1. Then, f, g and h are independently 0, 1, 2, 3 or 4, and a sum of f, g and h is 1 or more. Preferred f, g or h is 1 or 2.

Fifth, the preferred component compound will be described. Preferred compound (1) includes compound (1-1) to compound (1-19) described in item 2. In the compounds, at least one of the first components preferably includes compound (1-1), compound (1-2), compound (1-3), compound (1-4), compound (1-6), compound (1-7), compound (1-8), compound (1-9) or compound (1-16). At least two of the first components preferably includes a combination of compound (1-1) and compound (1-6), a combination of compound (1-1) and compound (1-9), or a combination of compound (1-4) and compound (1-6).

Preferred compound (3) includes compound (3-1) to compound (3-22) described in item 5. In the compounds, at least one of the third components preferably includes compound (3-1), compound (3-2), compound (3-3), compound (3-4), compound (3-6), compound (3-7), compound (3-8) or compound (3-10). At least two of the third components preferably includes a combination of compound (3-1) and compound (3-6), a combination of compound (3-1) and compound (3-10), a combination of compound (3-3) and compound (3-6), a combination of compound (3-3) and compound (3-10), a combination of compound (3-4) and compound (3-6), or a combination of compound (3-4) and compound (3-10).

Preferred compound (4) includes compound (4-1) to compound (4-12) described in item 7. In the compounds, at least one of the second components preferably includes compound (4-2), compound (4-4), compound (4-5) or compound (4-6). At least two of the second components preferably includes a combination of compound (4-2) and compound (4-4), or a combination of compound (4-2) and compound (4-6).

Preferred compound (5) includes compound (5-1) to compound (5-27) described in item 12. In the compounds, at least one of the additive components preferably includes compound (5-1), compound (5-2), compound (5-24), compound (5-25), compound (5-26) or compound (5-27). At least two of the additive components preferably includes a combination of compound (5-1) and compound (5-2), a combination of compound (5-1) and compound (5-18), a combination of compound (5-2) and compound (5-24), a combination of compound (5-2) and compound (5-25), a combination of compound (5-2) and compound (5-26), a combination of compound (5-25) and compound (5-26), or a combination of compound (5-18) and compound (5-24).

Sixth, the additive that may be added to the composition will be described. Such an additive includes the optically active compound, the antioxidant, the ultraviolet light absorber, the dye, the antifoaming agent, the polymerizable compound, the polymerization initiator and the polymerization inhibitor. The optically active compound is added to the composition for the purpose of inducing a helical structure in the liquid crystal molecules to give a twist angle. Examples of such a compound include compound (6-1) to compound (6-5). A preferred proportion of the optically active compound is about 5% by weight or less. A further preferred proportion is in the range of about 0.01% by weight to about 2% by weight.

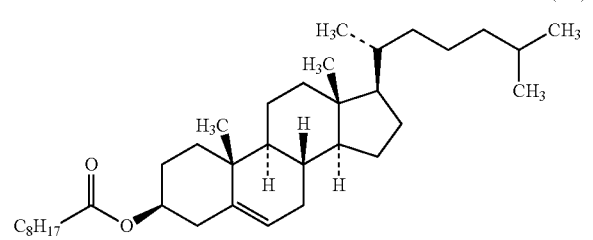

(6-1)

(6-2)

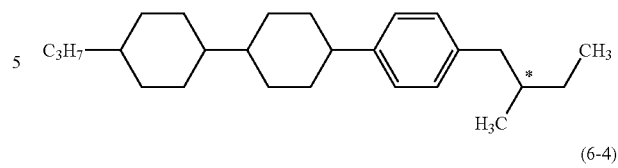

(6-3)

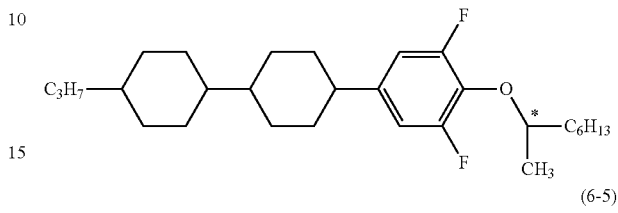

(6-4)

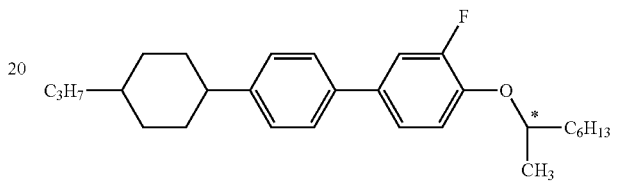

(6-5)

The antioxidant is added to the composition for preventing a decrease in the specific resistance caused by heating in air, or for maintaining a large voltage holding ratio at room temperature and also at the temperature close to the maximum temperature even after the device has been used for a long period of time. Specific examples of a preferred antioxidant include compound (7) in which n is an integer from 1 to 9.

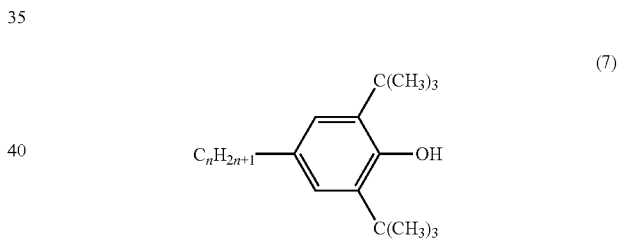

(7)

In compound (7), preferred n is 1, 3, 5, 7 or 9. Further preferred n is 7. Compound (7) in which n is 7 is effective in maintaining a large voltage holding ratio at room temperature and also at the temperature close to the maximum temperature even after the device has been used for a long period of time because such compound (7) has a small volatility. A preferred proportion of the antioxidant is about 50 ppm or more for achieving an effect thereof, and about 600 ppm or less for avoiding a decrease in the maximum temperature or an increase in the minimum temperature. A further preferred proportion is in the range of about 100 ppm to about 300 ppm.

Specific examples of a preferred ultraviolet light absorber include a benzophenone derivative, a benzoate derivative and a triazole derivative. A light stabilizer such as an amine having steric hindrance is also preferred. A preferred proportion of the absorber or the stabilizer is about 50 ppm or more for achieving an effect thereof, and about 10,000 ppm or less for avoiding the decrease in the maximum temperature or the increase in the minimum temperature. A further preferred proportion is in the range of about 100 ppm to about 10,000 ppm.

A dichroic dye such as an azo dye or an anthraquinone dye is added to the composition to be adapted for a device having a guest host (GH) mode. A preferred proportion of the dye is in the range of about 0.01% by weight to about 10% by weight. The antifoaming agent such as dimethyl silicone oil or methyl phenyl silicone oil is added to the composition for preventing foam formation. A preferred proportion of the antifoaming agent is about 1 ppm or more for achieving an effect thereof, and about 1,000 ppm or less for preventing a poor display. A further preferred proportion is in the range of about 1 ppm to about 500 ppm.

The polymerizable compound is used to be adapted for a polymer sustained alignment (PSA) mode device. Compound (5) is suitable for the purpose. Any other polymerizable compound that is different from compound (5) may be added to the composition together with compound (5). Any other polymerizable compound that is different from compound (5) may be added to the composition in place of compound (5). Specific examples of such a preferred polymerizable compound include acrylate, methacrylate, a vinyl compound, a vinyloxy compound, propenyl ether, an epoxy compound (oxirane and oxetane) and a vinyl ketone compound. Further preferred examples include an acrylate derivative or a methacrylate derivative. A preferred proportion of compound (5) is about 10% by weight or more based on the total amount of the polymerizable compound. A further preferred proportion is about 50% by weight or more. A particularly preferred proportion is about 80% by weight or more. A most preferred proportion is 100% by weight.

The polymerizable compound such as compound (5) is polymerized by irradiation with ultraviolet light. The polymerizable compound may be polymerized in the presence of a suitable initiator such as a photopolymerization initiator. Suitable conditions for polymerization, suitable types of the initiator and suitable amounts thereof are known to those skilled in the art and are described in literature. For example, Irgacure 651 (registered trademark; BASF), Irgacure 184 (registered trademark; BASF) or Darocur 1173 (registered trademark; BASF), each being a photoinitiator, is suitable for radical polymerization. A preferred proportion of the photopolymerization initiator is in the range of about 0.1% by weight to about 5% by weight based on the total amount of the polymerizable compound. A further preferred proportion is in the range of about 1% by weight to about 3% by weight.

Upon storing the polymerizable compound such as compound (5), the polymerization inhibitor may be added thereto for preventing polymerization. The polymerizable compound is ordinarily added to the composition without removing the polymerization inhibitor. Specific examples of the polymerization inhibitor include hydroquinone, a hydroquinone derivative such as methylhydroquinone, 4-t-butylcatechol, 4-methoxyphenol and phenothiazine.

Seventh, the methods for synthesizing the component compounds will be described. The compounds can be prepared according to known methods. Examples of the synthetic methods are described. Compound (1-4) is prepared according to a method described in JP 2014-114276 A. Compound (2) is prepared according to a method described in JP S59-176221 A. Compound (3-6) is prepared according to a method described in JP 2000-53602 A. Compound (4-2) is prepared according to a method described in JP S52-53783 A. Compound (5-18) is prepared according to a method described in JP H7-101900 A. The antioxidant is commercially available. A compound in which n in formula (7) is 1 is available from Sigma-Aldrich Corporation. Compound (7) in which n is 7 or the like is prepared according to a method described in U.S. Pat. No. 3,660,505 B.

Any compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared according to publicly known methods using the thus obtained compounds. For example, the component compounds are mixed and dissolved in each other by heating.

Last, the application of the composition will be described. Most of the composition has the minimum temperature of about −10° C. or lower, the maximum temperature of about 70° C. or higher, and the optical anisotropy in the range of about 0.07 to about 0.20. The composition having optical anisotropy in the range of about 0.08 to about 0.25 may be prepared by controlling the proportion of the component compounds or by mixing any other liquid crystal compound. Further, the composition having optical anisotropy in the range of about 0.10 to about 0.30 may be prepared according to the method. A device including the composition has the large voltage holding ratio. The composition is suitable for use in the AM device. The composition is particularly suitable for use in a transmissive AM device. The composition can be used as the composition having the nematic phase, and as the optically active composition by adding the optically active compound.

The composition can be used for the AM device. The composition can also be used for a PM device. The composition can also be used for the AM device and the PM device each having a mode such as the PC mode, the TN mode, the STN mode, the ECB mode, the OCB mode, the IPS mode, the FFS mode, the VA mode and the FPA mode. Use for the AM device having a mode such as the TN mode, the OCB mode, the IPS mode and the FFS mode is particularly preferred. In the AM device having the IPS mode or the FFS mode, alignment of liquid crystal molecules when no voltage is applied may be parallel or vertical to a glass substrate. The devices may be of a reflective type, a transmissive type or a transflective type. Use for the transmissive device is preferred. The composition can also be used for an amorphous silicon-TFT device or a polycrystal silicon-TFT device. The composition can also be used for a nematic curvilinear aligned phase (NCAP) device prepared by microencapsulating the composition, or for a polymer dispersed (PD) device in which a three-dimensional network-polymer is faulted in the composition.

EXAMPLES

The invention will be described in greater detail by way of Examples. However, the invention is not limited by the Examples. The invention includes a mixture of a composition in Example 1 and a composition in Example 2. The invention also includes a mixture in which at least two compositions in Examples were mixed. The thus prepared compound was identified by methods such as an NMR analysis. Characteristics of the compound, the composition and the device were measured by methods described below.

NMR analysis: For measurement, DRX-500 made by Bruker BioSpin Corporation was used. In $^1$H-NMR measurement, a sample was dissolved in a deuterated solvent such as $CDCl_3$, and measurement was carried out under conditions of room temperature, 500 MHz and 16 times of accumulation. Tetramethylsilane was used as an internal standard. In $^{19}$F-NMR measurement, $CFCl_3$ was used as an internal standard, and measurement was carried out under conditions of 24 times of accumulation. In explaining nuclear magnetic resonance spectra obtained, s, d, t, q, quin, sex and m stand for a singlet, a doublet, a triplet, a quartet, a quintet, a sextet and a multiplet, and br being broad, respectively.

Gas chromatographic analysis: For measurement, GC-14B Gas Chromatograph made by Shimadzu Corporation was used. A carrier gas was helium (2 mL per minute). A sample vaporizing chamber and a detector (FID) were set to 280° C. and 300° C., respectively. A capillary column DB-1 (length 30 m, bore 0.32 mm, film thickness 0.25 μm; dimethylpolysiloxane as a stationary liquid phase, non-polar) made by Agilent Technologies, Inc. was used for separation of component compounds. After the column was kept at 200° C. for 2 minutes, the column was heated to 280° C. at a rate of 5° C. per minute. A sample was prepared in an acetone solution (0.1% by weight), and then 1 microliter of the solution was injected into the sample vaporizing chamber. A recorder was C-RSA Chromatopac made by Shimadzu Corporation or the equivalent thereof. The resulting gas chromatogram showed a retention time of a peak and a peak area corresponding to each of the component compounds.

As a solvent for diluting the sample, chloroform, hexane or the like may also be used. The following capillary columns may also be used for separating component compounds: HP-1 (length 30 m, bore 0.32 mm, film thickness 0.25 μm) made by Agilent Technologies, Inc., Rtx-1 (length 30 m, bore 0.32 mm, film thickness 0.25 μm) made by Restek Corporation and BP-1 (length 30 m, bore 0.32 mm, film thickness 0.25 μm) made by SGE International Pty. Ltd. A capillary column CBP1-M50-025 (length 50 m, bore 0.25 mm, film thickness 0.25 μm) made by Shimadzu Corporation may also be used for the purpose of preventing an overlap of peaks of the compounds.

A proportion of liquid crystal compounds contained in the composition may be calculated by the method as described below. The mixture of the liquid crystal compounds is detected by gas chromatograph (FID). An area ratio of each peak in the gas chromatogram corresponds to the ratio (weight ratio) of the liquid crystal compound. When the capillary columns described above were used, a correction coefficient of each of the liquid crystal compounds may be regarded as 1 (one). Accordingly, the proportion (% by weight) of the liquid crystal compounds can be calculated from the area ratio of each peak.

Sample for measurement: When characteristics of the composition and the device were measured, the composition was used as a sample as was. Upon measuring characteristics of a compound, a sample for measurement was prepared by mixing the compound (15% by weight) with a base liquid crystal (85% by weight). Values of characteristics of the compound were calculated, according to an extrapolation method, using values obtained by measurement. (Extrapolated value)={(measured value of a sample)−0.85×(measured value of a base liquid crystal)}/0.15. When a smectic phase (or crystals) precipitated at the ratio thereof at 25° C., a ratio of the compound to the base liquid crystal was changed step by step in the order of (10% by weight: 90% by weight), (5% by weight: 95% by weight) and (1% by weight: 99% by weight). Values of maximum temperature, optical anisotropy, viscosity and dielectric anisotropy with regard to the compound were determined according to the extrapolation method.

A base liquid crystal described below was used. A proportion of the component compound was expressed in terms of weight percent (% by weight).

$C_3H_7$—⟨cyclohexyl⟩—COO—⟨phenyl⟩—$OC_2H_5$ 17.2%

$C_3H_7$—⟨cyclohexyl⟩—COO—⟨phenyl⟩—$OC_4H_9$ 27.6%

$C_4H_9$—⟨cyclohexyl⟩—COO—⟨phenyl⟩—$OC_2H_5$ 20.7%

$C_5H_{11}$—⟨cyclohexyl⟩—COO—⟨phenyl⟩—$OCH_3$ 20.7%

$C_5H_{11}$—⟨cyclohexyl⟩—COO—⟨phenyl⟩—$OC_2H_5$ 13.8%

Measuring method: Characteristics were measured according to the methods described below. Most of the measuring methods are applied as described in the Standard of Japan Electronics and Information Technology Industries Association (hereinafter abbreviated as JEITA) (JEITA ED-2521B) discussed and established by JEITA, or modified thereon. No thin film transistor (TFT) was attached to a TN device used for measurement.

(1) Maximum temperature of nematic phase (NI; ° C.): A sample was placed on a hot plate in a melting point apparatus equipped with a polarizing microscope, and heated at a rate of 1° C. per minute. Temperature when part of the sample began to change from a nematic phase to an isotropic liquid was measured. A maximum temperature of the nematic phase may be occasionally abbreviated as "maximum temperature."

(2) Minimum temperature of nematic phase ($T_c$; ° C.): Samples each having a nematic phase were put in glass vials and kept in freezers at temperatures of 0° C., −10° C., −20° C., −30° C. and −40° C. for 10 days, and then liquid crystal phases were observed. For example, when the sample maintained the nematic phase at −20° C. and changed to crystals or a smectic phase at −30° C., $T_c$ was expressed as $T_c$<−20° C. A minimum temperature of the nematic phase may be occasionally abbreviated as "minimum temperature."

(3) Viscosity (bulk viscosity; η; measured at 20° C.; mPa·s): For measurement, a cone-plate (E type) rotational viscometer made by Tokyo Keiki Inc. was used.

(4) Viscosity (rotational viscosity; γ1; measured at 25° C.; mPa·s): Measurement was carried out according to the method described in M. Imai et al., Molecular Crystals and Liquid Crystals, Vol. 259, p. 37 (1995). A sample was put in a VA device in which a distance (cell gap) between two glass substrates was 20 micrometers. Voltage was applied stepwise to the device in the range of 39 V to 50 V at an increment of 1 V. After a period of 0.2 second with no voltage application, voltage was repeatedly applied under conditions of only one rectangular wave (rectangular pulse; 0.2 second) and no voltage application (2 seconds). A peak current and a peak time of transient current generated by the applied voltage were measured. A value of rotational viscosity was obtained from the measured values and calculation equation (8) described on page 40 of the paper presented by M. Imai et al. Dielectric anisotropy required for the calculation was measured according to section (6) described below.

(5) Optical anisotropy (refractive index anisotropy; Δn; measured at 25° C.): Measurement was carried out by an Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when a direction of polarized light was parallel to a direction of rubbing. A refractive index (n⊥) was measured when the direction of polarized light was perpendicular to the direction of rubbing. A value of optical anisotropy was calculated from an equation: Δn=n∥−n⊥.

(6) Dielectric anisotropy (Δ∈; measured at 25° C.): A value of dielectric anisotropy was calculated from an equation: Δ∈=∈∥−∈⊥. A dielectric constant (∈∥ and ∈⊥) was measured as described below.

(1) Measurement of dielectric constant (∈∥): An ethanol (20 mL) solution of octadecyltriethoxysilane (0.16 mL) was applied to a well-cleaned glass substrate. After rotating the glass substrate with a spinner, the glass substrate was heated at 150° C. for 1 hour. A sample was put in a VA device in which a distance (cell gap) between two glass substrates was 4 micrometers, and the device was sealed with an ultraviolet-curable adhesive. Sine waves (0.5 V, 1 kHz) were applied to the device, and after 2 seconds, a dielectric constant (∈∥) of the liquid crystal molecules in a major axis direction was measured.

(2) Measurement of dielectric constant (∈⊥): A polyimide solution was applied to a well-cleaned glass substrate. After calcining the glass substrate, rubbing treatment was applied to the alignment film obtained. A sample was put in a TN device in which a distance (cell gap) between two glass substrates was 9 micrometers and a twist angle was 80 degrees. Sine waves (0.5 V, 1 kHz) were applied to the device, and after 2 seconds, a dielectric constant (∈⊥) of the liquid crystal molecules in a minor axis direction was measured.

(7) Threshold voltage (Vth; measured at 25° C.; V): For measurement, an LCD-5100 luminance meter made by Otsuka Electronics Co., Ltd. was used. A light source was a halogen lamp. A sample was put in a normally black mode VA device in which a distance (cell gap) between two glass substrates was 4 micrometers and a rubbing direction was anti-parallel, and the device was sealed with an ultraviolet-curable adhesive. A voltage (60 Hz, rectangular waves) to be applied to the device was stepwise increased from 0 V to 20 V at an increment of 0.02 V. On the occasion, the device was irradiated with light from a direction perpendicular to the device, and an amount of light transmitted through the device was measured. A voltage-transmittance curve was prepared, in which the maximum amount of light corresponds to 100% transmittance and the minimum amount of light corresponds to 0% transmittance. A threshold voltage is expressed in terms of a voltage at 10% transmittance.

(8) Voltage holding ratio (VHR-1; measured at 25° C.; %): A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is expressed in terms of a percentage of area A to area B.

(9) Voltage holding ratio (VHR-2; measured at 80° C.; %): A voltage holding ratio was measured according to procedures identical with the procedures described above except that measurement was carried out at 80° C. in place of 25° C. The thus obtained value was expressed in terms of VHR-2.

(10) Voltage holding ratio (VHR-3; measured at 25° C.; %): Stability to ultraviolet light was evaluated by measuring a voltage holding ratio after a device was irradiated with ultraviolet light. A TN device used for measurement had a polyimide alignment film, and a cell gap was 5 micrometers. A sample was injected into the device, and then the device was irradiated with light for 20 minutes. A light source was an ultra high-pressure mercury lamp USH-500D (made by Ushio, Inc.), and a distance between the device and the light source was 20 centimeters. In measurement of VHR-3, a decaying voltage was measured for 16.7 milliseconds. A composition having large VHR-3 has a large stability to ultraviolet light. A value of VHR-3 is preferably 90% or more, and further preferably, 95% or more.

(11) Voltage holding ratio (VHR-4; measured at 25° C.; %): Stability to heat was evaluated by measuring a voltage holding ratio after a TN device into which a sample was injected was heated in a constant-temperature bath at 80° C. for 500 hours. In measurement of VHR-4, a decaying voltage was measured for 16.7 milliseconds. A composition having large VHR-4 has a large stability to heat.

(12) Response time (τ; measured at 25° C.; ms): For measurement, an LCD-5100 luminance meter made by Otsuka Electronics Co., Ltd. was used. A light source was a halogen lamp. A low-pass filter was set at 5 kHz. A sample was put in a normally black mode VA device in which a distance (cell gap) between two glass substrates was 4 micrometers and a rubbing direction was anti-parallel. The device was sealed with an ultraviolet-curable adhesive. A voltage (rectangular waves; 60 Hz, 10 V, 0.5 second) was applied to the device. On the occasion, the device was irradiated with light from a direction perpendicular to the device, and an amount of light transmitted through the device was measured. The maximum amount of light corresponds to 100% transmittance, and the minimum amount of light corresponds to 0% transmittance. A response time was expressed in terms of time required for a change from 90% transmittance to 10% transmittance (fall time; millisecond).

(13) Specific resistance (ρ; measured at 25° C.; ω cm): Into a vessel equipped with electrodes, 1.0 milliliter of sample was injected. A direct current voltage (10 V) was applied to the vessel, and a direct current after 10 seconds was measured. Specific resistance was calculated from the following equation: (specific resistance)={(voltage)×(electric capacity of a vessel)}/{(direct current)×(dielectric constant of vacuum)}.

The compounds in Examples were represented using symbols according to definitions in Table 3 described below. In Table 3, the configuration of 1,4-cyclohexylene is trans. A parenthesized number next to a symbolized compound corresponds to the number of the compound. A symbol (−) means any other liquid crystal compound. A proportion (percentage) of the liquid crystal compound is expressed in terms of weight percent (% by weight) based on the weight of the liquid crystal composition. Values of the characteristics of the composition were summarized in the last part.

TABLE 3

Method for Description of Compounds using Symbols
R—(A₁)—Z₁— ... —Zₙ—(Aₙ)—R'

1) Left-terminal Group R— | Symbol
--- | ---
F—$C_nH_{2n}$— | Fn-
$C_nH_{2n+1}$— | n-
$C_nH_{2n+1}O$— | nO—
$C_mH_{2m+1}OC_nH_{2n}$— | mOn-
$CH_2$=CH— | V—
$C_nH_{2n+1}$—CH=CH— | nV—
$CH_2$=CH—$C_nH_{2n}$— | Vn-
$C_mH_{2m+1}$—CH=CH—$C_nH_{2n}$— | mVn-
$CF_2$=CH— | VFF—
$CF_2$=CH—$C_nH_{2n}$— | VFFn-
$CH_2$=CH—COO— | AC—
$CH_2$=C($CH_3$)—COO— | MAC—

2) Right-terminal Group —R' | Symbol
--- | ---
—$C_nH_{2n+1}$ | -n
—$OC_nH_{2n+1}$ | —On
—CH=$CH_2$ | —V
—CH=CH—$C_nH_{2n+1}$ | —Vn
—$C_nH_{2n}$—CH=$CH_2$ | -nV
—$C_mH_{2m}$—CH=CH—$C_nH_{2n+1}$ | -mVn
—CH=$CF_2$ | —VFF
—OCO—CH=$CH_2$ | -AC
—OCO—C($CH_3$)=$CH_2$ | -MAC 3) Bonding Group —$Z_n$— | Symbol
--- | ---
—$C_nH_{2n}$— | n
—COO— | E
—CH=CH— | V
—CH=CHO— | VO
—OCH=CH— | OV
—$CH_2O$— | 1O
—$OCH_2$— | O1

4) Ring —$A_n$— | Symbol
--- | ---
 | H
 | B
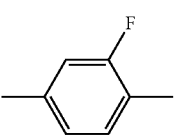 | B(F)
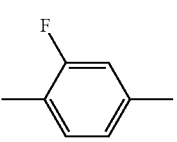 | B(2F)
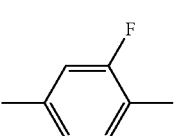 | B(F,F)
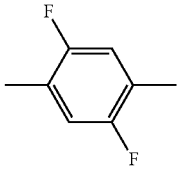 | B(2F,5F)
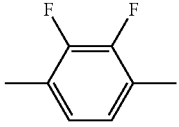 | B(2F,3F)
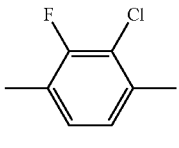 | B(2F,3CL)
 | dh
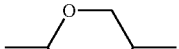 | Dh
 | ch
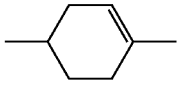 | Cro(7F,8F)

5) Examples of Description

Example 1. 3-HHB(2F,3F)-OV1

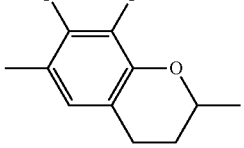

Example 2. 2-BB(F)B-3

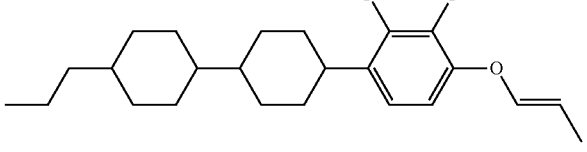

Example 3. V-HHB-1

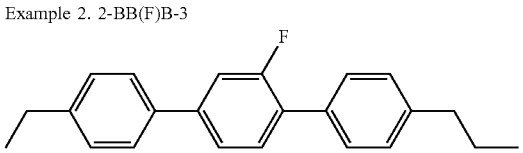

TABLE 3-continued

Method for Description of Compounds using Symbols
R—(A$_1$)—Z$_1$— ... —Z$_n$—(A$_n$)—R'

Example 4. 3-HHB(2F,3F)-O2

Comparative Example 1

Example 8 was selected from the compositions disclosed in JP 2014-114276 A. The basis thereof is that the composition contains compound (1-1), compound (1-6), compound (3-2), compound (3-10), compound (3-12), compound (4-4) and compound (4-10), and the maximum temperature of the nematic phase (NI) is the highest. Components and characteristics of the composition were as described below.

| | | |
|---|---|---|
| 3-HB(2F,3F)-OV1 | (1-1) | 4% |
| V-HHB(2F,3F)-OV1 | (1-6) | 4% |
| 3-HH-4 | (—) | 6% |
| 3-H2B(2F,3F)-O2 | (3-2) | 22% |
| 5-H2B(2F,3F)-O2 | (3-2) | 22% |
| 2-HHB(2F,3CL)-O2 | (3-12) | 2% |
| 3-HHB(2F,3CL)-O2 | (3-12) | 3% |
| 4-HHB(2F,3CL)-O2 | (3-12) | 2% |
| 5-HHB(2F,3CL)-O2 | (3-12) | 2% |
| 3-HBB(2F,3F)-O2 | (3-10) | 9% |
| 5-HBB(2F,3F)-O2 | (3-10) | 9% |
| V-HHB-1 | (4-4) | 6% |
| 3-HHB-3 | (4-4) | 6% |
| 3-HHEBH-5 | (4-10) | 3% |

NI=82.2° C.; Δn=0.101; Δ∈=−3.8; η=29.1 mPa·s.

Example 1

| | | |
|---|---|---|
| V-HHB(2F,3F)-OV1 | (1-6) | 5% |
| 3-HH-V | (2) | 29% |
| V-HB(2F,3F)-O2 | (3-1) | 7% |
| 3-BB(2F,3F)-O2 | (3-4) | 7% |
| V2-BB(2F,3F)-O2 | (3-4) | 7% |
| 2-HHB(2F,3F)-O2 | (3-6) | 3% |
| 3-HHB(2F,3F)-O2 | (3-6) | 8% |
| V-HHB(2F,3F)-O2 | (3-6) | 10% |
| V-HHB(2F,3F)-O4 | (3-6) | 5% |
| 3-HBB(2F,3F)-O2 | (3-10) | 7% |
| V-HBB(2F,3F)-O2 | (3-10) | 8% |
| V-HHB-1 | (4-4) | 4% |

NI=83.0° C.; Tc<−20° C.; η=17.7 mPa·s; Δn=0.107; Δ∈=−3.8.

Example 2

| | | |
|---|---|---|
| 3-HB(2F,3F)-OV1 | (1-1) | 5% |
| 3-HH-V | (2) | 20% |
| 3-H2B(2F,3F)-O2 | (3-2) | 7% |
| 3-BB(2F,3F)-O2 | (3-4) | 4% |
| 5-BB(2F,3F)-O2 | (3-4) | 3% |
| 3-HHB(2F,3F)-O2 | (3-6) | 8% |
| V-HHB(2F,3F)-O2 | (3-6) | 10% |
| 3-HH2B(2F,3F)-O2 | (3-7) | 3% |
| 5-HH2B(2F,3F)-O2 | (3-7) | 4% |
| V-HH1OB(2F,3F)-O2 | (3-8) | 3% |
| 2-HBB(2F,3F)-O2 | (3-10) | 7% |
| 3-HHB(2F,3Cl)-O2 | (3-12) | 2% |
| 5-HHB(2F,3Cl)-O2 | (3-12) | 3% |
| 3-HchB(2F,3F)-O2 | (3-19) | 2% |
| 3-BB(2F)B(2F,3F)-O2 | (3-20) | 4% |
| 3-BB(F)B(2F,3F)-O2 | (3-21) | 2% |
| 5-HB-O2 | (4-1) | 2% |
| V2-BB-1 | (4-2) | 2% |
| V-HBB-2 | (4-5) | 4% |
| 2-HH-3 | (—) | 5% |

NI=85.1° C.; Tc<−20° C.; η=18.5 mPa·s; Δn=0.110; Δ∈=−3.7.

Example 3

| | | |
|---|---|---|
| 3-HH2B(2F,3F)-OV1 | (1-2) | 3% |
| 4-H2B(2F,3F)-OV1 | (1-2) | 3% |
| 5-H2B(2F,3F)-OV1 | (1-2) | 3% |
| 3-HH-V | (2) | 20% |
| 3-HH-V1 | (2) | 9% |
| 3-H1OB(2F,3F)-O2 | (3-3) | 3% |
| 3-B(2F,3F)B(2F,3F)-O2 | (3-5) | 3% |
| 3-HHB(2F,3F)-O2 | (3-6) | 4% |
| 4-HHB(2F,3F)-O2 | (3-6) | 4% |
| 3-HH1OB(2F,3F)-O2 | (3-8) | 4% |
| 2-BB(2F,3F)B-3 | (3-9) | 3% |
| 5-HBB(2F,3F)-O2 | (3-10) | 3% |
| V-HBB(2F,3F)-O2 | (3-10) | 4% |
| 3-HBB(2F,3Cl)-O2 | (3-13) | 2% |
| 5-HBB(2F,3Cl)-O2 | (3-13) | 3% |
| 3-HH1OCro(7F,8F)-5 | (3-15) | 4% |
| 3-HDhB(2F,3F)-O2 | (3-16) | 5% |
| 3-dhB(2F,3F)-O2 | (3-17) | 5% |
| 3-B(2F)B(2F,3F)-O2 | (3-22) | 2% |
| 3-HBB-2 | (4-5) | 2% |
| 1-BB(F)B-2V | (4-6) | 3% |
| V2-BB2B-1 | (4-8) | 3% |
| 3-HH-VFF | (—) | 5% |

NI=83.5° C.; Tc<−20° C.; η=21.3 mPa·s; Δn=0.110; Δ∈=−3.5.

Example 4

| | | |
|---|---|---|
| 3-BB(2F,3F)-OV1 | (1-4) | 3% |
| 4-BB(2F,3F)-OV1 | (1-4) | 3% |
| 5-BB(2F,3F)-OV1 | (1-4) | 3% |
| 3-HH-V | (2) | 25% |
| 1V2-HH-2V1 | (2) | 2% |
| 3-HB(2F,3F)-O2 | (3-1) | 5% |
| 5-HB(2F,3F)-O2 | (3-1) | 5% |
| 2-HHB(2F,3F)-O2 | (3-6) | 5% |
| 3-HHB(2F,3F)-O2 | (3-6) | 10% |
| 2-HBB(2F,3F)-O2 | (3-10) | 5% |
| 3-HBB(2F,3F)-O2 | (3-10) | 10% |
| 3-HEB(2F,3F)B(2F,3F)-O2 | (3-11) | 3% |
| 3-H1OCro(7F,8F)-5 | (3-14) | 3% |
| 3-chB(2F,3F)-O2 | (3-18) | 3% |
| V-chB(2F,3F)-O2 | (3-18) | 3% |
| 3-HHEH-3 | (4-3) | 3% |
| 5-B(F)BB-3 | (4-7) | 3% |
| 5-HB(F)BH-3 | (4-11) | 3% |
| 1O1-HBBH-5 | (—) | 3% |

NI=83.9° C.; Tc<−20° C.; η=21.6 mPa·s; Δn=0.109; Δ∈=−3.5.

Example 5

| | | |
|---|---|---|
| 3-HB(2F,3F)-OV1 | (1-1) | 5% |
| 3-HchB(2F,3F)-OV1 | (1-16) | 2% |
| 4-HchB(2F,3F)-OV1 | (1-16) | 2% |
| 5-HchB(2F,3F)-OV1 | (1-16) | 2% |
| 3-HH-V | (2) | 22% |
| 5-HH-V | (2) | 3% |
| 3-HB(2F,3F)-O2 | (3-1) | 5% |
| 3-BB(2F,3F)-O2 | (3-4) | 3% |
| 5-BB(2F,3F)-O2 | (3-4) | 3% |
| 2-HHB(2F,3F)-O2 | (3-6) | 5% |
| 3-HHB(2F,3F)-O2 | (3-6) | 12% |
| V-HHB(2F,3F)-O2 | (3-6) | 3% |
| V-HH1OB(2F,3F)-O2 | (3-8) | 3% |
| 2-HBB(2F,3F)-O2 | (3-10) | 5% |
| 3-HBB(2F,3F)-O2 | (3-10) | 12% |
| 1-BB-3 | (4-2) | 4% |
| 1-BB-5 | (4-2) | 3% |
| 3-HHB-1 | (4-4) | 3% |
| 3-HHEBH-3 | (4-10) | 3% |

NI=90.2° C.; Tc<−20° C.; η=17.6 mPa·s; Δn=0.109; Δ∈=−3.5.

Example 6

| | | |
|---|---|---|
| 3-H1OB(2F,3F)-OV1 | (1-3) | 3% |
| 4-H1OB(2F,3F)-OV1 | (1-3) | 3% |
| 5-H1OB(2F,3F)-OV1 | (1-3) | 3% |
| 3-HH-V | (2) | 25% |
| 3-HB(2F,3F)-O2 | (3-1) | 5% |
| 3-BB(2F,3F)-O2 | (3-4) | 5% |
| 2-HHB(2F,3F)-O2 | (3-6) | 5% |
| 3-HHB(2F,3F)-O2 | (3-6) | 7% |
| V-HHB(2F,3F)-O2 | (3-6) | 5% |
| 2-HBB(2F,3F)-O2 | (3-10) | 5% |
| 3-HBB(2F,3F)-O2 | (3-10) | 10% |
| 5-HBB(2F,3F)-O2 | (3-10) | 2% |
| 5-BB(2F)B(2F,3F)-O2 | (3-20) | 3% |
| 3-BB(F)B(2F,3F)-O2 | (3-21) | 3% |
| 3-HB-O2 | (4-1) | 3% |
| 3-HB(F)HH-2 | (4-9) | 3% |
| 3-HBB(F)B-2 | (4-12) | 3% |
| 2-HH-3 | (—) | 7% |

NI=84.3° C.; Tc<−20° C.; η=19.8 mPa·s; Δn=0.109; Δ∈=−3.5.

Example 7

| | | |
|---|---|---|
| 3-HH2B(2F,3F)-OV1 | (1-7) | 2% |
| 4-HH2B(2F,3F)-OV1 | (1-7) | 2% |
| 5-HH2B(2F,3F)-OV1 | (1-7) | 2% |
| 3-HH-V | (2) | 28% |
| V-HB(2F,3F)-O2 | (3-1) | 3% |
| 3-HB(2F,3F)-O2 | (3-1) | 5% |
| 5-HB(2F,3F)-O2 | (3-1) | 5% |
| 5-H2B(2F,3F)-O2 | (3-2) | 3% |
| 2-H1OB(2F,3F)-O2 | (3-3) | 3% |
| 3-HHB(2F,3F)-O2 | (3-6) | 12% |
| 4-HHB(2F,3F)-O2 | (3-6) | 2% |
| 2-HH1OB(2F,3F)-O2 | (3-8) | 3% |
| 3-HBB(2F,3F)-O2 | (3-10) | 12% |
| 3-HH1OCro(7F,8F)-5 | (3-15) | 3% |
| 3-HchB(2F,3F)-O2 | (3-19) | 3% |
| V-HBB-3 | (4-5) | 5% |
| 2-BB(F)B-2V | (4-6) | 3% |
| 3-BB(F)B-2V | (4-6) | 4% |

NI=89.6° C.; Tc<−20° C.; η=18.1 mPa·s; Δn=0.107; Δ∈=−3.5.

Example 8

| | | |
|---|---|---|
| 3-HBB(2F,3F)-OV1 | (1-9) | 2% |
| 4-HBB(2F,3F)-OV1 | (1-9) | 2% |
| 5-HBB(2F,3F)-OV1 | (1-9) | 2% |
| 3-HH-V | (2) | 25% |
| F3-HH-V | (2) | 3% |
| V-HB(2F,3F)-O2 | (3-1) | 5% |
| 3-HB(2F,3F)-O2 | (3-1) | 10% |
| 3-HHB(2F,3F)-O2 | (3-6) | 8% |
| 4-HHB(2F,3F)-O2 | (3-6) | 3% |
| V-HHB(2F,3F)-O2 | (3-6) | 3% |
| 3-HBB(2F,3F)-O2 | (3-10) | 5% |
| 5-HBB(2F,3F)-O2 | (3-10) | 5% |
| V-HBB(2F,3F)-O2 | (3-10) | 5% |
| 3-H1OCro(7F,8F)-5 | (3-14) | 3% |
| 3-HDhB(2F,3F)-O2 | (3-16) | 3% |
| 3-dhBB(2F,3F)-O2 | (3-17) | 3% |
| 5-HchB(2F,3F)-O2 | (3-19) | 3% |
| 3-HBB-2 | (4-5) | 8% |
| 3-HH-O1 | (—) | 2% |

NI=89.5° C.; Tc<−20° C.; η=19.8 mPa·s; Δn=0.107; Δ∈=−3.6.

Example 9

| | | |
|---|---|---|
| 3-HH1OB(2F,3F)-OV1 | (1-8) | 2% |
| 4-HH1OB(2F,3F)-OV1 | (1-8) | 2% |
| 5-HH1OB(2F,3F)-OV1 | (1-8) | 2% |
| 3-HH-V | (2) | 20% |
| 5-HH-V | (2) | 3% |
| 3-HH-V1 | (2) | 3% |
| 5-HB(2F,3F)-O2 | (3-1) | 5% |
| 3-H1OB(2F,3F)-O2 | (3-3) | 5% |
| 3-BB(2F,3F)-O2 | (3-4) | 10% |
| 2O-BB(2F,3F)-O2 | (3-4) | 5% |
| V-HHB(2F,3F)-O2 | (3-6) | 10% |
| 3-HBB(2F,3F)-O2 | (3-10) | 10% |
| 4-HBB(2F,3F)-O2 | (3-10) | 5% |
| 1V2-BB-1 | (4-2) | 3% |
| 3-HHEBH-4 | (4-10) | 3% |
| 5-HBB(F)B-3 | (4-12) | 3% |
| 2-HH-5 | (—) | 3% |
| 3-HH-4 | (—) | 3% |
| 5-HH-O1 | (—) | 3% |

NI=83.2° C.; Tc<−20° C.; η=16.3 mPa·s; Δn=0.108; Δ∈=−3.6.

Example 10

| | | |
|---|---|---|
| 3-HB(2F,3F)-OV1 | (1-1) | 5% |
| V-HHB(2F,3F)-OV1 | (1-6) | 2% |
| 3-HHB(2F,3F)-OV1 | (1-6) | 2% |
| 5-HHB(2F,3F)-OV1 | (1-6) | 2% |
| 3-HH-V | (2) | 30% |
| 3-HB(2F,3F)-O2 | (3-1) | 10% |
| 3-H2B(2F,3F)-O2 | (3-2) | 4% |
| 2O-BB(2F,3F)-O2 | (3-4) | 5% |

-continued

| | | |
|---|---|---|
| 3-HHB(2F,3F)-O2 | (3-6) | 15% |
| 2-BB(2F,3F)B-3 | (3-9) | 3% |
| 2-BB(2F,3F)B-4 | (3-9) | 3% |
| V-HBB(2F,3F)-O2 | (3-10) | 5% |
| 3-HEB(2F,3F)B(2F,3F)-O2 | (3-11) | 5% |
| V2-HchB(2F,3F)-O2 | (3-19) | 3% |
| 5-B(F)BB-2 | (4-7) | 3% |
| 3-HHEBH-5 | (4-10) | 3% |

NI=83.4° C.; Tc<−20° C.; η=18.8 mPa·s; Δn=0.108; Δ∈=−3.5.

Example 11

| | | |
|---|---|---|
| 3-H1OB(2F,3F)-OV1 | (1-3) | 3% |
| 4-H1OB(2F,3F)-OV1 | (1-3) | 3% |
| 5-H1OB(2F,3F)-OV1 | (1-3) | 3% |
| 3-HH-V | (2) | 16% |
| 3-HH-V1 | (2) | 9% |
| 5-HB(2F,3F)-O2 | (3-1) | 5% |
| 3-BB(2F,3F)-O2 | (3-4) | 5% |
| 2-HHB(2F,3F)-O2 | (3-6) | 5% |
| V-HHB(2F,3F)-O2 | (3-6) | 10% |
| V-HHB(2F,3F)-O4 | (3-6) | 5% |
| 3-HBB(2F,3F)-O2 | (3-10) | 10% |
| 5-HBB(2F,3F)-O2 | (3-10) | 5% |
| 3-HDhB(2F,3F)-O2 | (3-16) | 3% |
| 7-HB-1 | (4-1) | 3% |
| 1-BB-3 | (4-2) | 3% |
| 3-HHEH-5 | (4-3) | 3% |
| 3-HHB-3 | (4-4) | 3% |
| V2-HHB-1 | (4-4) | 3% |
| 2-BB(F)B-3 | (4-6) | 3% |

NI=86.1° C.; Tc<−20° C.; η=18.2 mPa·s; Δn=0.107; Δ∈=−3.6.

Example 12

| | | |
|---|---|---|
| 3-BB(2F,3F)-OV1 | (1-4) | 3% |
| V-HHB(2F,3F)-OV1 | (1-6) | 3% |
| 3-HH1OB(2F,3F)-OV1 | (1-8) | 3% |
| 3-HH-V | (2) | 23% |
| 5-HH-V | (2) | 5% |
| 3-HB(2F,3F)-O2 | (3-1) | 10% |
| 2O-BB(2F,3F)-O2 | (3-4) | 5% |
| 3-HHB(2F,3F)-O2 | (3-6) | 12% |
| 3-HBB(2F,3F)-O2 | (3-10) | 8% |
| V-HBB(2F,3F)-O2 | (3-10) | 5% |
| 3-H1OCro(7F,8F)-5 | (3-14) | 3% |
| 3-HH1OCro(7F,8F)-5 | (3-15) | 3% |
| 3-HHB-O1 | (4-4) | 3% |
| VFF-HHB-1 | (4-4) | 3% |
| V-HBB-3 | (4-5) | 5% |
| 2-BB(F)B-5 | (4-6) | 3% |
| 2-HH-3 | (—) | 3% |

NI=86.0° C.; Tc<−20° C.; η=19.6 mPa·s; Δn=0.107; Δ∈=−3.4.

Example 13

| | | |
|---|---|---|
| 3-H2B(2F,3F)-OV1 | (1-2) | 3% |
| 3-HBB(2F,3F)-OV1 | (1-9) | 3% |
| 5-HBB(2F,3F)-OV1 | (1-9) | 3% |
| 3-HH-V | (2) | 30% |
| 2-H1OB(2F,3F)-O2 | (3-3) | 3% |
| 3-H1OB(2F,3F)-O2 | (3-3) | 3% |
| 3-BB(2F,3F)-O2 | (3-4) | 5% |
| 2-HHB(2F,3F)-O2 | (3-6) | 5% |
| 3-HHB(2F,3F)-O2 | (3-6) | 8% |
| 4-HHB(2F,3F)-O2 | (3-6) | 5% |
| V-HHB(2F,3F)-O2 | (3-6) | 5% |
| 2-BB(2F,3F)B-3 | (3-9) | 3% |
| 2-HBB(2F,3F)-O2 | (3-10) | 5% |
| 3-HBB(2F,3F)-O2 | (3-10) | 5% |
| 5-HBB(2F,3F)-O2 | (3-10) | 5% |
| 3-chB(2F,3F)-O2 | (3-18) | 3% |
| 3-HB-O2 | (4-1) | 3% |
| V-HBB-2 | (4-5) | 3% |

NI=84.0° C.; Tc<−20° C.; η=17.2 mPa·s; Δn=0.108; Δ∈=−3.6.

Example 14

| | | |
|---|---|---|
| 3-BB(2F,3F)-OV1 | (1-4) | 3% |
| V-HHB(2F,3F)-OV1 | (1-6) | 2% |
| 3-HHB(2F,3F)-OV1 | (1-6) | 2% |
| 5-HHB(2F,3F)-OV1 | (1-6) | 2% |
| 3-HH-V | (2) | 25% |
| 3-HB(2F,3F)-O2 | (3-1) | 10% |
| 5-HB(2F,3F)-O2 | (3-1) | 5% |
| 5-BB(2F,3F)-O2 | (3-4) | 5% |
| 3-HHB(2F,3F)-O2 | (3-6) | 12% |
| V-HHB(2F,3F)-O2 | (3-6) | 3% |
| 3-HBB(2F,3F)-O2 | (3-10) | 8% |
| 4-HBB(2F,3F)-O2 | (3-10) | 3% |
| V-HBB(2F,3F)-O2 | (3-10) | 5% |
| 3-dhBB(2F,3F)-O2 | (3-17) | 3% |
| 1-BB-3 | (4-2) | 3% |
| 3-HHB-1 | (4-4) | 3% |
| V-HHB-1 | (4-4) | 3% |
| 3-HBB-2 | (4-5) | 3% |

NI=83.7° C.; Tc<−20° C.; =19.1 mPa·s; Δn=0.110; Δ∈=−3.5.

Example 15

| | | |
|---|---|---|
| 3-HB(2F,3F)-OV1 | (1-1) | 3% |
| 3-HH1OB(2F,3F)-OV1 | (1-8) | 2% |
| 4-HH1OB(2F,3F)-OV1 | (1-8) | 2% |
| 5-HH1OB(2F,3F)-OV1 | (1-8) | 2% |
| 3-HH-V | (2) | 20% |
| 1V2-HH-2V1 | (2) | 5% |
| V-HB(2F,3F)-O2 | (3-1) | 5% |
| 5-H2B(2F,3F)-O2 | (3-2) | 5% |
| 2-HHB(2F,3F)-O2 | (3-6) | 5% |
| 4-HHB(2F,3F)-O2 | (3-6) | 6% |
| 2-HH1OB(2F,3F)-O2 | (3-8) | 3% |
| 3-HH1OB(2F,3F)-O2 | (3-8) | 3% |
| 2-BB(2F,3F)B-3 | (3-9) | 3% |
| 2-HBB(2F,3F)-O2 | (3-10) | 6% |
| 3-HBB(2F,3F)-O2 | (3-10) | 7% |
| 5-HBB(2F,3F)-O2 | (3-10) | 7% |
| V2-HchB(2F,3F)-O2 | (3-19) | 4% |
| 3-HB-O2 | (4-1) | 6% |
| 5-HB-O2 | (4-1) | 3% |
| VFF2-HHB-1 | (4-4) | 3% |

NI=91.7° C.; Tc<−20° C.; η=19.3 mPa·s; Δn=0.107; Δ∈=−3.7.

Example 16

| | | |
|---|---|---|
| 3-HB(2F,3F)-OV1 | (1-1) | 3% |
| V-HHB(2F,3F)-OV1 | (1-6) | 3% |
| 3-HBB(2F,3F)-OV1 | (1-9) | 3% |
| 3-HH-V | (2) | 28% |
| 3-HH-V1 | (2) | 5% |
| 3-B(2F,3F)B(2F,3F)-O2 | (3-5) | 3% |
| 3-HHB(2F,3F)-O2 | (3-6) | 12% |
| V-HHB(2F,3F)-O2 | (3-6) | 5% |
| 3-HH2B(2F,3F)-O2 | (3-7) | 3% |
| 5-HH2B(2F,3F)-O2 | (3-7) | 3% |
| 2-HBB(2F,3F)-O2 | (3-10) | 8% |
| 3-HBB(2F,3F)-O2 | (3-10) | 5% |
| V-HBB(2F,3F)-O2 | (3-10) | 5% |
| 3-HEB(2F,3F)B(2F,3F)-O2 | (3-11) | 3% |
| 3-HDhB(2F,3F)-O2 | (3-16) | 3% |
| V-chB(2F,3F)-O2 | (3-18) | 3% |
| 1-BB-5 | (4-2) | 5% |

NI=88.6° C.; Tc<−20° C.; η=18.1 mPa·s; Δn=0.107; Δ∈=−3.6.

Example 17

| | | |
|---|---|---|
| V-HHB(2F,3F)-OV1 | (1-6) | 2% |
| 3-HHB(2F,3F)-OV1 | (1-6) | 2% |
| 5-HHB(2F,3F)-OV1 | (1-6) | 2% |
| 3-HH2B(2F,3F)-OV1 | (1-7) | 2% |
| 4-HH2B(2F,3F)-OV1 | (1-7) | 2% |
| 5-HH2B(2F,3F)-OV1 | (1-7) | 2% |
| 3-HH-V | (2) | 20% |
| 3-HH-V1 | (2) | 10% |
| 3-HB(2F,3F)-O2 | (3-1) | 6% |
| 5-HB(2F,3F)-O2 | (3-1) | 6% |
| 3-BB(2F,3F)-O2 | (3-4) | 5% |
| 5-BB(2F,3F)-O2 | (3-4) | 5% |
| 2-HHB(2F,3F)-O2 | (3-6) | 6% |
| 3-HHB(2F,3F)-O2 | (3-6) | 8% |
| 4-HBB(2F,3F)-O2 | (3-10) | 6% |
| 5-HBB(2F,3F)-O2 | (3-10) | 10% |
| 3-HBB-2 | (4-5) | 3% |
| V-HBB-2 | (4-5) | 3% |

NI=86.5° C.; Tc<−20° C.; η=18.9 mPa·s; Δn=0.107; Δ∈=−3.6.

Example 18

| | | |
|---|---|---|
| 3-H1OB(2F,3F)-OV1 | (1-3) | 3% |
| 3-HH1OB(2F,3F)-OV1 | (1-8) | 3% |
| 3-HBB(2F,3F)-OV1 | (1-9) | 3% |
| 3-HH-V | (2) | 23% |
| V-HB(2F,3F)-O2 | (3-1) | 5% |
| 3-HB(2F,3F)-O2 | (3-1) | 5% |
| 2-HHB(2F,3F)-O2 | (3-6) | 3% |
| 3-HHB(2F,3F)-O2 | (3-6) | 10% |
| V-HHB(2F,3F)-O2 | (3-6) | 5% |
| 3-HBB(2F,3F)-O2 | (3-10) | 8% |
| 4-HBB(2F,3F)-O2 | (3-10) | 5% |
| 5-HBB(2F,3F)-O2 | (3-10) | 5% |
| 3-H1OCro(7F,8F)-5 | (3-14) | 3% |
| 3-dhBB(2F,3F)-O2 | (3-17) | 3% |
| 1-BB-3 | (4-2) | 5% |
| V-HHB-1 | (4-4) | 3% |
| V-HBB-3 | (4-5) | 3% |
| 2-HH-3 | (—) | 5% |

NI=85.3° C.; Tc<−20° C.; =20.2 mPa·s; Δn=0.107; Δ∈=−3.6.

The maximum temperature of the nematic phase (NI) of the composition in Comparative Example 1 was 82.2° C. On the other hand, NI of the compositions in Example 1 to Example 18 were 83.0 to 91.7° C. Thus, the compositions in Examples were found to have a higher NI in comparison with the composition in Comparative Example. Accordingly, the liquid crystal composition of the invention is concluded to have superb characteristics.

INDUSTRIAL APPLICABILITY

A liquid crystal composition of the invention satisfies at least one of characteristics such as a high maximum temperature, a low minimum temperature, a small viscosity, a suitable optical anisotropy, a large negative dielectric anisotropy, a large specific resistance, a high stability to ultraviolet light and a high stability to heat, or has a suitable balance regarding at least two of the characteristics. A liquid crystal display device including the composition has characteristics such as a short response time, a large voltage holding ratio, a low threshold voltage, a large contrast ratio and a long service life, and thus can be used for a liquid crystal projector, a liquid crystal television and so forth.

What is claimed is:
1. A liquid crystal composition that has a nematic phase and a negative dielectric anisotropy, and contains at least one compound selected from compounds represented by formula (1) as a first component, and at least one compound selected from compounds represented by formula (2) as a second component, at least one compound selected from compounds represented by formula (3) as a third component, and at least one compound selected from compounds represented by formula (4) as a fourth component:

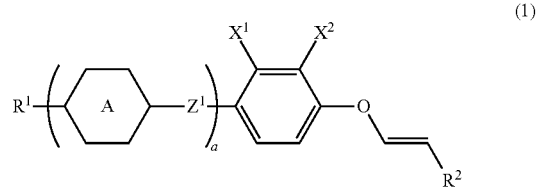

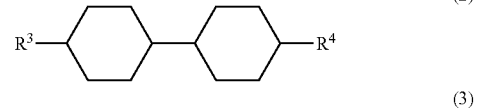

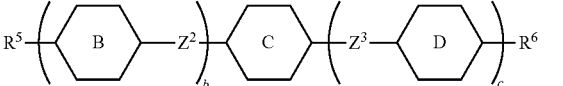

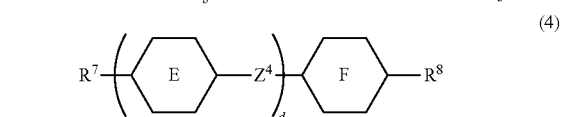

wherein, in formula (1) and formula (2), $R^1$ and $R^3$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one piece of hydrogen is replaced by fluorine or chlorine; $R^2$ is alkyl having 1 to 12 carbons; $R^4$ is alkenyl having 2 to 12 carbons; ring A is 1,4-cyclohexylene, 1,4-cyclohexenylene, tetrahydropyran-2,5-diyl, 1,4-phenylene, 1,4-phenylene in which at least one piece of hydrogen is replaced by fluorine or chlorine, naphthalene-2,6-diyl, naphthalene-2,6-diyl in which at least one piece of hydrogen is replaced by fluorine or chlorine, chroman-2,6-diyl, or chroman-2,6-diyl in which at least one piece of hydrogen is replaced by fluorine or chlorine; $Z^1$ is a single bond, ethylene, carbonyloxy or methyleneoxy; $X^1$ and $X^2$ are independently fluorine or chlorine; and a is 1,2 or 3;

in formula (3), $R^5$ and $R^6$ are independently alkyl having 1 to 12 carbons, alkoxy having 1 to 12 carbons, alkenyl having 2 to 12 carbons, or alkyl having 1 to 12 carbons in which at least one piece of hydrogen is replaced by fluorine or chlorine; ring B and ring D are independently 1,4-cyclohexylene, 1,4-cyclohexenylene, tetrahydropyran-2,5-diyl, 1,4-phenylene, 1,4-phenylene in which at least one piece of hydrogen is replaced by fluorine or chlorine, naphthalene-2,6-diyl, naphthalene-2,6-diyl in which at least one piece of hydrogen is replaced by fluorine or chlorine, chroman-2,6-diyl, or chroman-2,6-diyl in which at least one piece of hydrogen is replaced by fluorine or chlorine; ring C is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^2$ and $Z^3$ are independently a single bond, ethylene, carbonyloxy or methyleneoxy; b is 1, 2 or 3, c is 0 or 1, and a sum of b and c is 3 or less;

in formula (4), $R^7$ and $R^8$ are independently alkyl having 1 to 12 carbons, alkoxy having 1 to 12 carbons, alkenyl having 2 to 12 carbons, alkyl having 1 to 12 carbons in which at least one piece of hydrogen is replaced by fluorine or chlorine, or alkenyl having 2 to 12 carbons in which at least one piece of hydrogen is replaced by fluorine or chlorine; ring E and ring F are independently 1,4-cyclohexylene, 1,4-phenylene, 2-fluoro-1,4-phenylene or 2,5-difluoro-1,4-phenylene; $Z^4$ is a single bond, ethylene or carbonyloxy; and d is 1, 2 or 3 herein, when d is 1 and $Z^4$ is a single bond, ring F is 1,4-phenylene, 2-fluoro-1,4-phenylene or 2,5-difluoro-1,4-phenylene.

2. The liquid crystal composition according to claim 1, containing at least one compound selected from the group of compounds represented by formula (1-1) to formula (1-19) as the first component:

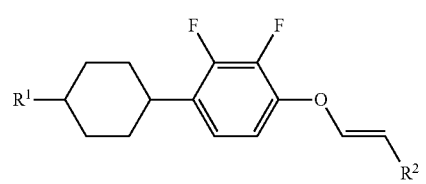
(1-1)

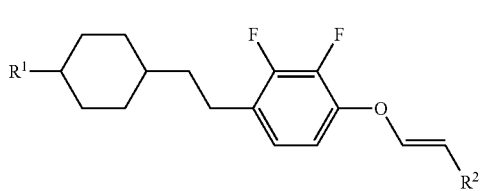
(1-2)

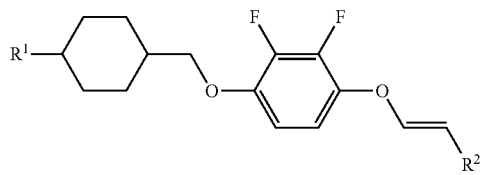
(1-3)

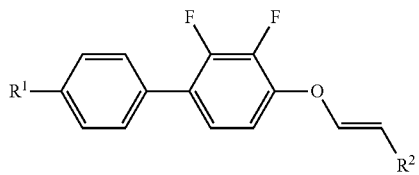
(1-4)

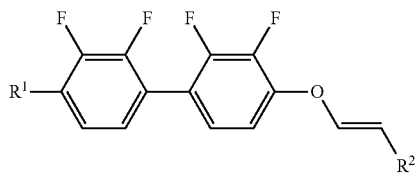
(1-5)

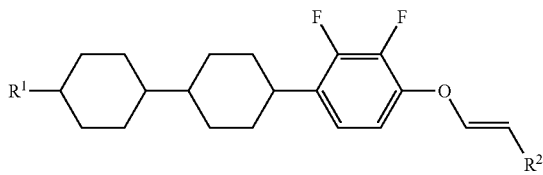
(1-6)

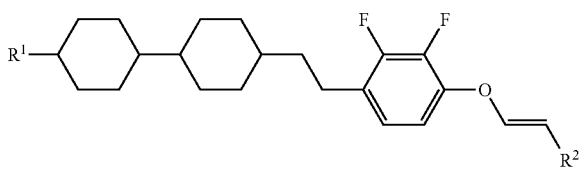
(1-7)

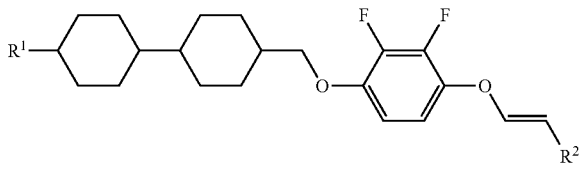
(1-8)

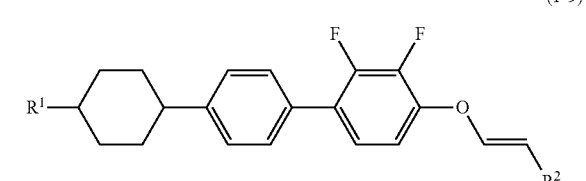
(1-9)

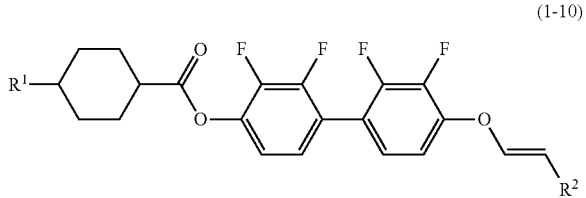
(1-10)

(1-11)
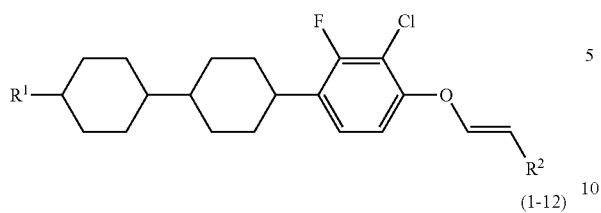

(1-12)
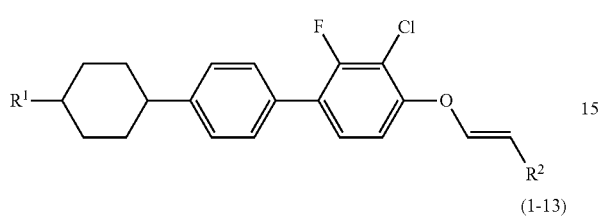

(1-13)
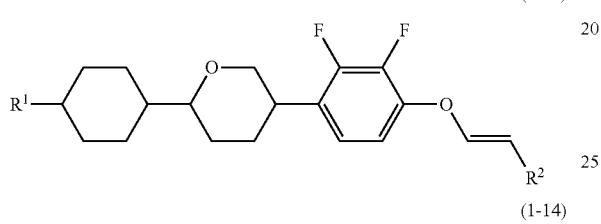

(1-14)
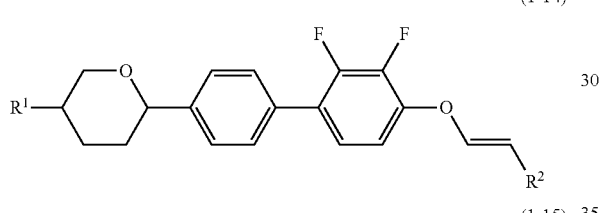

(1-15)
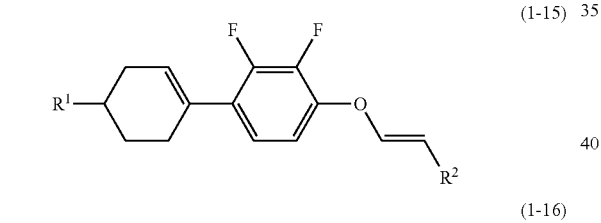

(1-16)
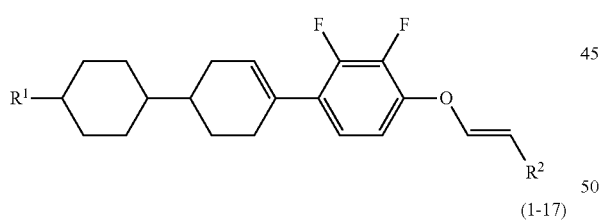

(1-17)
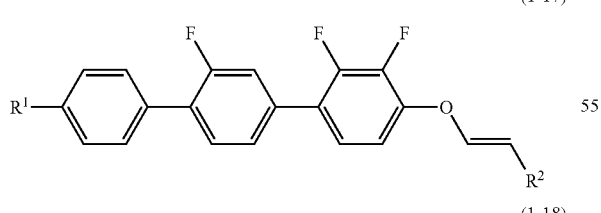

(1-18)
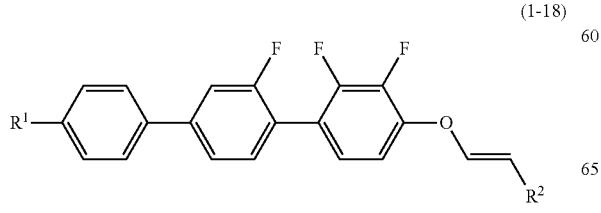

(1-19)
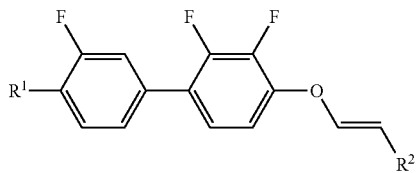

wherein, in formula (1-1) to formula (1-19), $R^1$ is alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one piece of hydrogen is replaced by fluorine or chlorine; and $R^2$ is alkyl having 1 to 12 carbons.

3. The liquid crystal composition according to claim 1, wherein a proportion of the first component is in the range of 3% by weight to 30% by weight, and a proportion of the second component is in the range of 15% by weight to 70% by weight, based on the total weight of the liquid crystal composition.

4. The liquid crystal composition according to claim 1, containing at least one compound selected from the group of compounds represented by formula (3-1) to formula (3-22) as the third component:

(3-1)
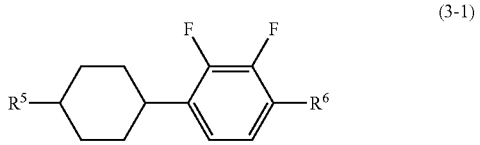

(3-2)
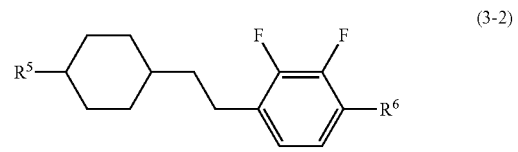

(3-3)
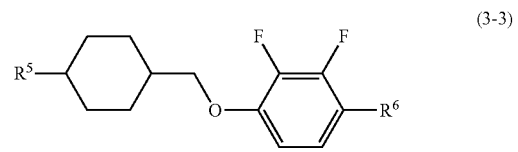

(3-4)
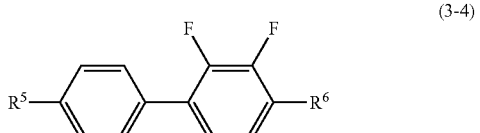

(3-5)
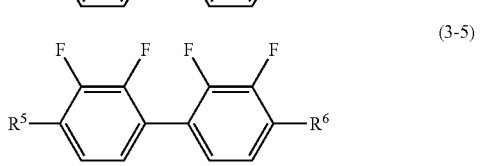

(3-6)
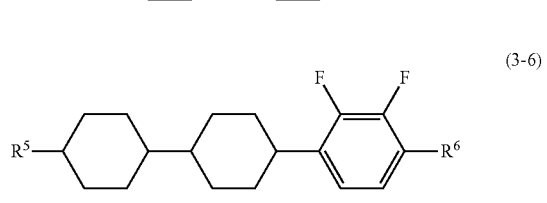

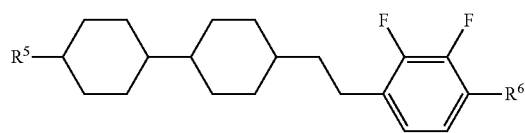 (3-7)

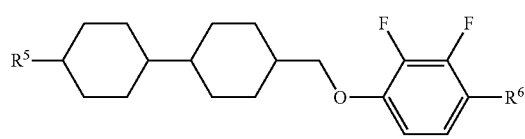 (3-8)

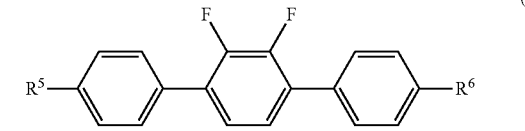 (3-9)

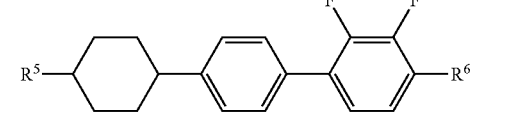 (3-10)

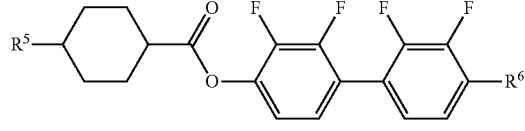 (3-11)

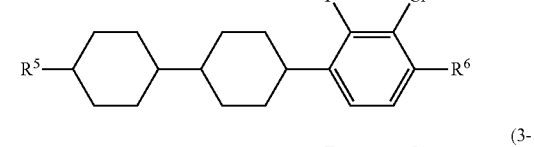 (3-12)

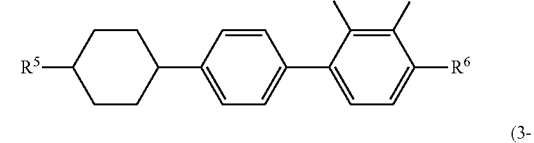 (3-13)

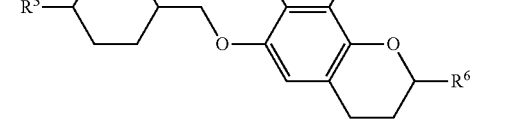 (3-14)

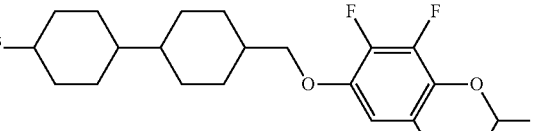 (3-15)

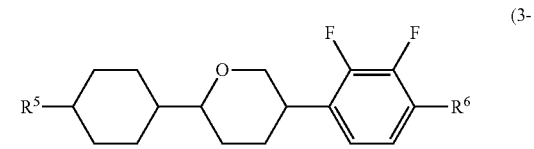 (3-16)

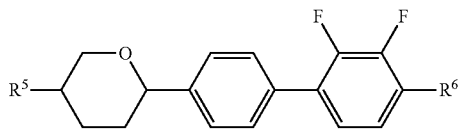 (3-17)

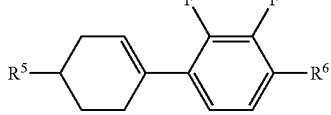 (3-18)

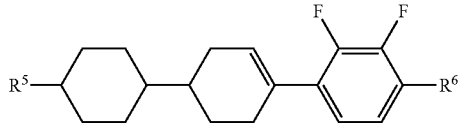 (3-19)

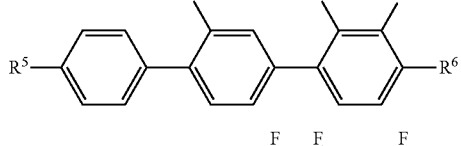 (3-20)

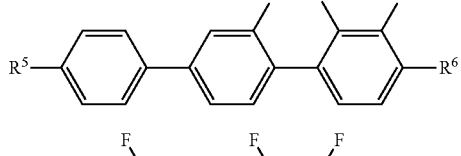 (3-21)

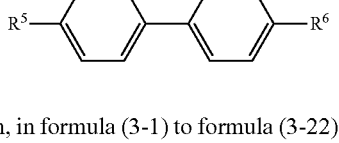 (3-22)

wherein, in formula (3-1) to formula (3-22), $R^5$ and $R^6$ are independently alkyl having 1 to 12 carbons, alkoxy having 1 to 12 carbons, alkenyl having 2 to 12 carbons, or alkyl having 1 to 12 carbons in which at least one piece of hydrogen is replaced by fluorine or chlorine.

5. The liquid crystal composition according to claim 1, wherein a proportion of the third component is in the range of 20% by weight to 80% by weight based on the total amount of the liquid crystal composition.

6. The liquid crystal composition according to claim 1, containing at least one compound selected from the group of compounds represented by formula (4-1) to formula (4-12) as the fourth component:

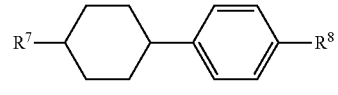 (4-1)

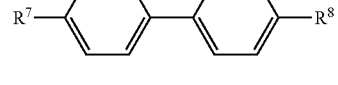 (4-2)

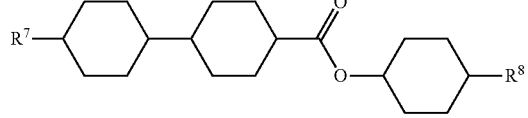 (4-3)

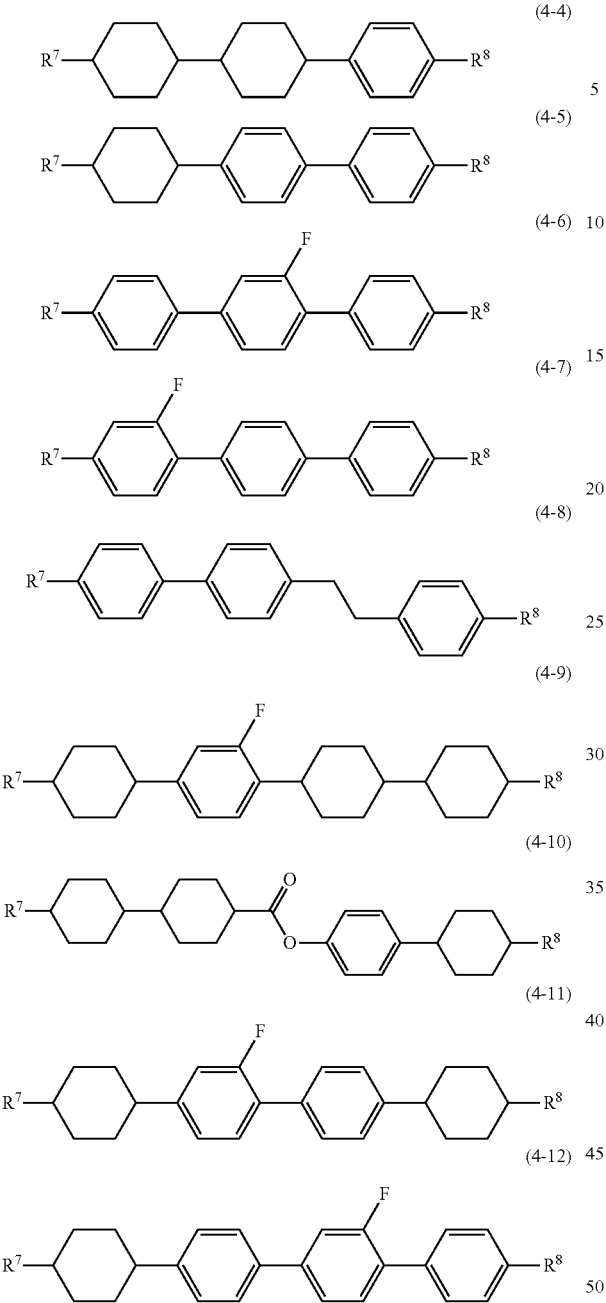

wherein, in formula (4-1) to formula (4-12), $R^7$ and $R^8$ are independently alkyl having 1 to 12 carbons, alkoxy having 1 to 12 carbons, alkenyl having 2 to 12 carbons, alkyl having 1 to 12 carbons in which at least one piece of hydrogen is replaced by fluorine or chlorine, or alkenyl having 2 to 12 carbons in which at least one piece of hydrogen is replaced by fluorine or chlorine.

7. The liquid crystal composition according to claim 1, wherein a proportion of the fourth component is in the range of 2% by weight to 30% by weight based on the total amount of the liquid crystal composition.

8. The liquid crystal composition according to claim 1, containing at least one polymerizable compound selected from compounds represented by formula (5) as an additive component:

$$\left(\begin{matrix}P^1\\Sp^1\end{matrix}\right)_f \left(\begin{matrix}P^2\\Sp^2\end{matrix}\right)_g \left(\begin{matrix}P^3\\Sp^3\end{matrix}\right)_h \tag{5}$$

G—Z⁵—(I—Z⁶)ₑ—J wherein, in formula (5), ring G and ring J are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine; ring I is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine; $Z^5$ and $Z^6$ are independently a single bond or alkylene having 1 to 10 carbons, and in the alkylene, at least one piece of —CH$_2$— may be replaced by —O—, —CO—, —COO— or —OCO—, and at least one piece of —CH$_2$—CH$_2$— may be replaced by —CH=CH—, —C(CH$_3$)=CH—, —CH=C(CH$_3$)— or —C(CH$_3$)=C(CH$_3$)—, and in the groups, at least one piece of hydrogen may be replaced by fluorine or chlorine; $P^1$, $P^2$ and $P^3$ are independently a polymerizable group; $Sp^1$, $Sp^2$ and $Sp^3$ are independently a single bond or alkylene having 1 to 10 carbons, and in the alkylene, at least one piece of —CH$_2$— may be replaced by —O—, —COO—, —OCO— or —OCOO—, and at least one piece of —CH$_2$—CH$_2$— may be replaced by —CH=CH— or —C≡C—, and in the groups, at least one piece of hydrogen may be replaced by fluorine or chlorine; e is 0, 1, or 2; f, g and h are independently 0, 1, 2, 3 or 4; and a sum of f, g and h is 1 or more.

9. The liquid crystal composition according to claim 8, containing at least one polymerizable compound selected from the group of compounds represented by formula (5-1) to formula (5-27) as the additive component:

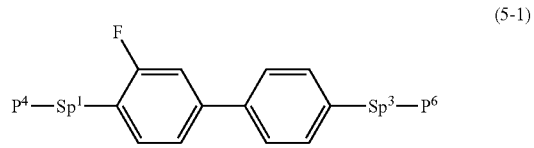

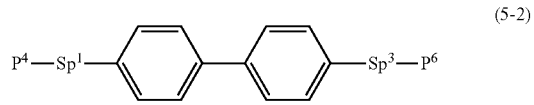

(5-3) 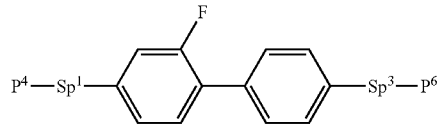
(5-4) 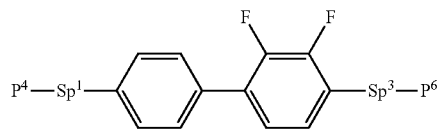
(5-5) 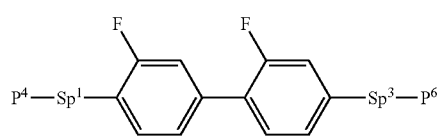
(5-6) 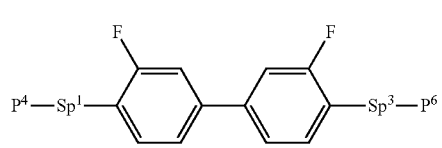
(5-7) 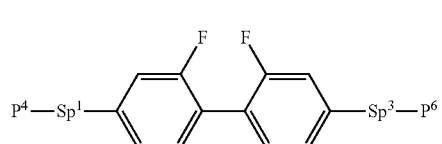
(5-8) 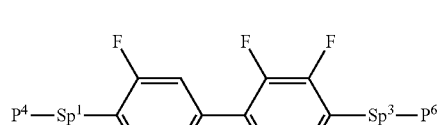
(5-9) 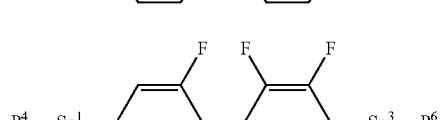
(5-10) 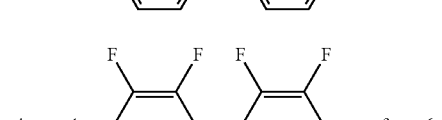
(5-11) 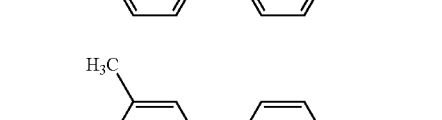
(5-12) 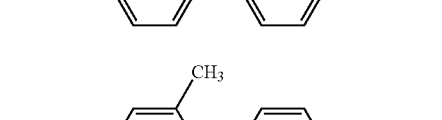
(5-13) 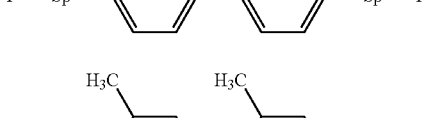
(5-14) 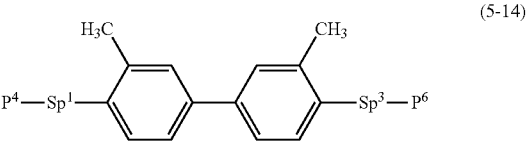
(5-15) 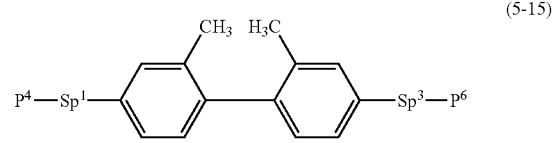
(5-16) 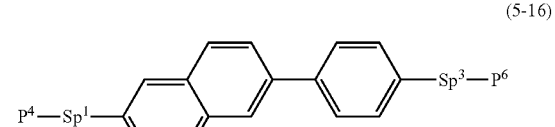
(5-17) 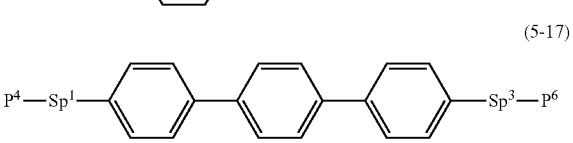
(5-18) 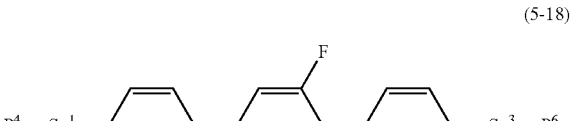
(5-19) 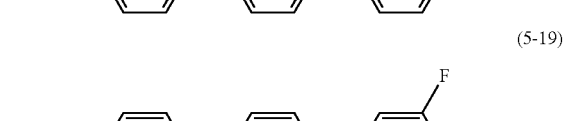
(5-20) 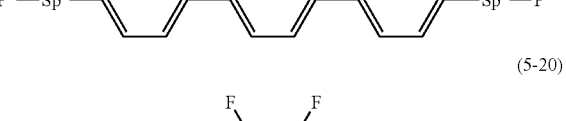
(5-21) 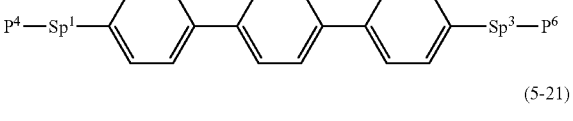
(5-22) 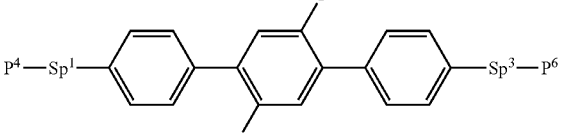
(5-23) 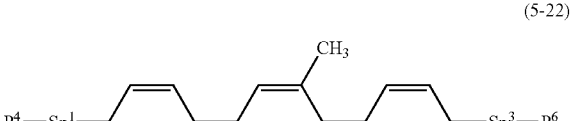

-continued (5-24)
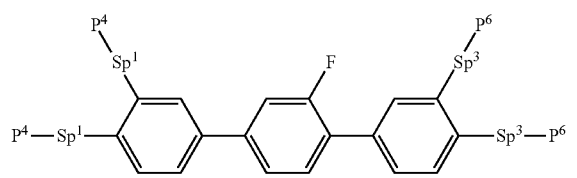

(5-25)
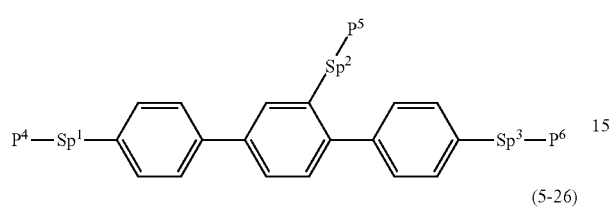

(5-26)
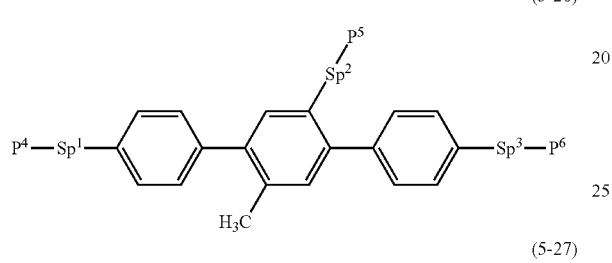

(5-27)
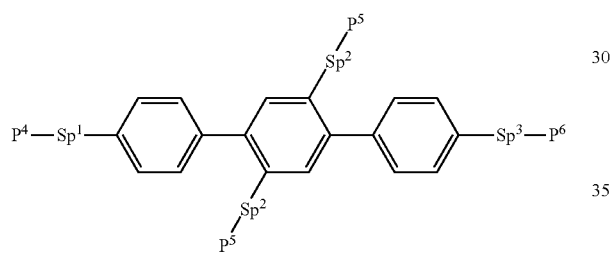

wherein, in formula (5-1) to formula (5-27), $P^4$, $P^5$ and $P^6$ are independently a polymerizable group selected from the group of groups represented by formula (P-1) to formula (P-3); and (P-1)
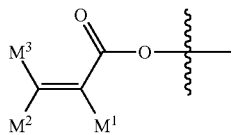

-continued (P-2)
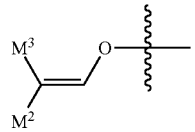

(P-3)
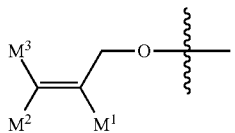

wherein, in formula (P-1) to formula (P-3), $M^1$, $M^2$ and $M^3$ are independently hydrogen, fluorine, alkyl having 1 to 5 carbons, or alkyl having 1 to 5 carbons in which at least one piece of hydrogen is replaced by fluorine or chlorine; and in formula (5-1) to formula (5-27), $Sp^1$, $Sp^2$ and $Sp^3$ are independently a single bond or alkylene having 1 to 10 carbons, and in the alkylene, at least one piece of —$CH_2$— may be replaced by —O—, —COO—, —OCO— or —OCOO—, and at least one piece of —$CH_2$—$CH_2$— may be replaced by —CH=CH— or —C≡C—, and in the groups, at least one piece of hydrogen may be replaced by fluorine or chlorine.

10. The liquid crystal composition according to claim 8, wherein a proportion of addition of the additive component is in the range of 0.03% by weight to 10% by weight based on the total amount of the liquid crystal composition.

11. A liquid crystal display device, including the liquid crystal composition according to claim 1.

12. The liquid crystal display device according to claim 11, wherein an operating mode in the liquid crystal display device includes an IPS mode, a VA mode, an FFS mode or an FPA mode, and a driving mode in the liquid crystal display device includes an active matrix mode.

13. A polymer sustained alignment mode liquid crystal display device, wherein the liquid crystal display device includes the liquid crystal composition according to claim 8.

14. A polymer sustained alignment mode liquid crystal display device, wherein the liquid crystal display device includes the liquid crystal composition according to claim 8, and the polymerizable compound in the liquid crystal composition is polymerized.

* * * * *